US011420186B2

(12) United States Patent
Zahir

(10) Patent No.: US 11,420,186 B2
(45) Date of Patent: Aug. 23, 2022

(54) CA-Y-CARBONATE NANOSHEETS, THEIR USE, AND SYNTHESIS

(71) Applicant: King Fahd University of Petroleum and Minerals, Dhahran (SA)

(72) Inventor: Md. Hasan Zahir, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 799 days.

(21) Appl. No.: 16/363,353

(22) Filed: Mar. 25, 2019

(65) Prior Publication Data
US 2020/0306725 A1 Oct. 1, 2020

(51) Int. Cl.
*B01J 20/28* (2006.01)
*B01J 20/02* (2006.01)
*B01J 20/04* (2006.01)
*C01F 17/247* (2020.01)
(Continued)

(52) U.S. Cl.
CPC ..... *B01J 20/28007* (2013.01); *B01J 20/0207* (2013.01); *B01J 20/043* (2013.01); *B01J 20/28042* (2013.01); *C01F 17/247* (2020.01); *B01J 20/3078* (2013.01); *B82Y 30/00* (2013.01); *B82Y 40/00* (2013.01); *C01P 2002/22* (2013.01); *C01P 2002/74* (2013.01); *C01P 2002/82* (2013.01); *C01P 2002/85* (2013.01); *C01P 2004/03* (2013.01); *C01P 2004/04* (2013.01);
(Continued)

(58) Field of Classification Search
CPC .. B01J 20/0207; B01J 20/043; B01J 20/3078; C01F 17/247; B82Y 30/00; B82Y 40/00; C01P 2002/22; C02F 1/281; C02F 1/288; C02F 2101/20
See application file for complete search history.

(56) References Cited

U.S. PATENT DOCUMENTS 3,879,523 A * 4/1975 Miyata ............... B01J 21/10
423/508
4,752,397 A 6/1988 Sood
(Continued)

FOREIGN PATENT DOCUMENTS

EP    3 192 772 A1   7/2017
JP    5323218 B2    10/2013

OTHER PUBLICATIONS

Rojas (Copper, lead and cadmium removal by Ca Al layered double hydroxides, Applied Clay Science, Jan. 2014) (Year: 2014).*
(Continued)

*Primary Examiner* — Alexandra M Moore
*Assistant Examiner* — Logan Edward Laclair
(74) *Attorney, Agent, or Firm* — Oblon, McClelland, Maier & Neustadt, L.L.P.

(57) ABSTRACT

Nanosheets of $Ca^{2+}$ and $Y^{3+}$, with $CO_3^{2-}$ in the interlayer with a uniform diameter and lengths of several tens of microns have been successfully synthesized in a hydrotalcite layer structure (a layered double hydroxide), using a hydrothermal method. The formation mechanism of lamellar $CaY-CO_3^{2-}$ layered double hydroxides (LDHs) depends on the molar ratio of Ca and Y and the reaction time and temperature. The resulting LDH materials exhibit excellent affinity and selectivity for heavy transition metal and metalloid ions.

17 Claims, 21 Drawing Sheets

(51) Int. Cl.
 C02F 103/06 (2006.01)
 B01J 20/30 (2006.01)
 B82Y 40/00 (2011.01)
 B82Y 30/00 (2011.01)
 C02F 1/28 (2006.01)
 C02F 101/20 (2006.01)
 C02F 101/10 (2006.01)

(52) U.S. Cl.
 CPC ...... C01P 2004/64 (2013.01); C01P 2006/17 (2013.01); C02F 1/281 (2013.01); C02F 1/288 (2013.01); C02F 2101/103 (2013.01); C02F 2101/20 (2013.01); C02F 2103/06 (2013.01)

(56) References Cited

U.S. PATENT DOCUMENTS

2013/0129592 A1  5/2013  Kim et al.
2013/0316898 A1  11/2013  De Leij et al.

OTHER PUBLICATIONS

Guo, et al.; Layered double hydroxide/eggshell membrane: An inorganic biocomposite membrane as an efficient adsorbent for Cr(VI) removal; Chemical Engineering Journal vol. 166, Issue 1; ScienceDirect; pp. 81-87; Jan. 2011; Abstract Only; 2 Pages.

Rojas; Copper, lead and cadmium removal by Ca Al layered double hydroxides; Applied Cay Science vol. 87; ScienceDirect; pp. 254-259; Abstract Only; 2 Pages.

Guatam, et al.; Heavy Metals in Water: Presence, Removal and Safety; Royal Society of Chemistry; Sep. 22, 2014; Chapter 1; 3 Pages.

Zhang, et al.; Super adsorption capability of rhombic dodecahedral Ca-Al layered double oxides for Congo red removal; ScienceDirect; Journal of Alloys and Compounds vol. 768; pp. 572-581; Nov. 2018; Abstract Only; 3 Pages.

* cited by examiner

Hydrotalcite

CA-Y-CARBONATE NANOSHEETS, THEIR USE, AND SYNTHESIS

STATEMENT OF ACKNOWLEDGEMENT

The support provided by the Center of Research Excellence in Renewable Energy (CoRE-RE), Research Institute at King Fahd University of Petroleum & Minerals (KFUPM) is gratefully acknowledged.

BACKGROUND OF THE INVENTION

Field of the Invention

The present disclosure relates to nanostructured adsorbents, particularly comprising calcium and yttrium with carbonate interlayers, as well as methods of removing metal ions from water, e.g., using such nanostructured adsorbents, and methods of making such nanostructured adsorbents.

Description of the Related Art

An important environmental problem is the pollution of water, and there is an urgent need for the development of new kinds of materials that can effectively remove toxic metal ions from water. There are presently no commercially available one-step systems and/or absorbents for the simultaneous removal of toxic heavy metal ions and the poisonous metalloid arsenic from drinking water.

Trace amounts of arsenic in drinking water are believed to be responsible for skin, liver, lung, and bladder cancers, as well as immune disorders, neurological diseases, and functional disturbances in the cardiovascular and nervous system. As a result, the World Health Organization (WHO) and the United States Environmental Protection Agency have fixed the maximum concentration of arsenic in drinking water at 0.010 mg/L. An even more strict regulation is stipulated by the Australian National Health and Medical Research Council, 0.007 mg/L.

Currently, 70 million people are affected by arsenic contamination in (drinking) water, particularly in the USA, Mexico, Canada, New Zealand, China, Taiwan, Argentina, Chile, Poland, Japan, Bangladesh, India, and Pakistan. The arsenic contamination of water in Bangladesh and the West Bengal region of India is extreme, i.e., much higher than the WHO limit. Cost-effective, scaleable solutions would be useful for these large affected populations.

The presence of toxic heavy metals, such as $Hg^{2+}$, $Pb^{2+}$, and $Cd^{2+}$, in water is also a major environmental concern, due to harmful effects of heavy metals on humans and other species. The development of effective processes to remove (toxic) heavy metals and arsenic from water, bringing such metals down to no more than trace levels, e.g., <5, 2, 1, 0.5, 0.1, or 0.01 ppb, is a great challenge. Challenges remain in developing highly effective systems for removing metal ions from water, in that water purification must be rapid and is very sensitive, e.g., to pH, the chemical stability of absorbents, and so on.

Conventional methods of removing toxic or other metal ions from water may involve, for example, chemical precipitation, coagulation-flocculation, electrocoagulation, membrane separation, ion exchange, and/or evaporation. These methods are not sufficiently effective because of their low capacities and low removal rates. Other methods including cementation, membrane filtration, solvent extraction, ion-exchange, adsorption, and biosorption have also been tested. Certain readily available materials, such as zeolites, activated carbon, polymers, biomaterials, and sorption resins, have been used to adsorb metal ions in such methods to date. Of the many suggested methods, adsorption is particularly attractive because of its low cost, simple design, robust operability, and high removal efficiency of adsorbents.

Orange waste, husk rice, and pinewood are examples of bioorganic materials and agricultural waste-based adsorbents that have been tested in water remediation. However, methods using these materials require high capital investment and create the problem of sludge disposal. Moreover, soluble organic compounds usually consume high levels of chemical and biological oxygen after their release in aqueous systems, which can jeopardize aquatic life and generate new ecological problems.

Nanostructured materials are another candidate for metal ion absorption because of their potential high surface to volume ratios, among other things. However, nanostructured materials have not been shown effective in practical applications due to their tendency to agglomerate. In addition, release levels of nanostructured materials are difficult to control during remediation processes. Aziz et al., in *Bioresource Techn*. 2008, 99, 1578-1583, demonstrated that $CaCO_3$ can remove more than 90% of heavy metal ions at a concentration of 2 mg/L at pH 8.5. However, such a system is not viable for practical applications.

Clays have also been considered as adsorbents because of their low cost, high surface areas, and hydrophilicity. However, clays are incapable of removing trace levels of metals, e.g., between 0.1 and 3 mg/L.

Sulfides are effective adsorbent materials for the removal of toxic metal ions from water because they form strong covalent bonds with heavy metals. However, sulfur can cause hyperplasia, abundant nasal secretions, and dyspnea even associated with bleeding.

Moreover, precipitation of sulfide ions cannot reduce the concentrations of heavy metals below the levels required for drinking water.

Synthetic inorganic materials such as lamellar solids with distinct cavities and surfaces have advantageous properties and the potential to resolve the above environmental and industrial problems. Lamellar solids known as "layered double hydroxides" (LDHs) or "hydrotalcite-like compounds" may include anionic clay materials. LDHs have layered crystal structures and qualitatively resemble intercalation compounds. A distinguishing feature of LDH structures is the complete charge separation between their gallery ions and layers. The typical formula of LDHs is $[M^{II}_{(1-x)} M^{III}_x(OH)_2]^{x+}[x/n\ A^{n-} \cdot yH_2O]^{x-}$, where MII and MIII are divalent and trivalent metal cations respectively, and $A^{n-}$ is an n-valent anion. LDHs have a variety of applications because compositional diversity is possible in both the layers and the interlayer anions, which can also allow functional diversity.

Over the last decade, various synthetic routes for LDHs with new compositions, morphologies, and applications have been reported. Divalent ($M^{II}$) and trivalent cations ($M^{III}$) have been reported to be useful to prepare LDHs by substituting them fully or partially for $Mg^{2+}$ or $Al^{3+}$ in brucite-like layers. The only requirement of the divalent and trivalent cations is that their radii for octahedral coordination should not be excessively different from those of $Mg^{2+}$ and $Al^{3+}$.

The ionic radii of $Ca^{2+}$ and $Y^{3+}$ are 0.100 nm and 0.090 nm respectively, so it is theoretically possible to synthesize CaY-based LDHs. However, no Ca—Y LDHs have yet been reported. The incorporation of $Y_2O_3$ in small amounts into MgAl LDHs containing $Cr^{3+}$ has been demonstrated. A $Y_2O_3$ adsorbent prepared by a hydrothermal method has been reported to exhibit a high arsenate, As(V), adsorption capacity.

Arsenate, As(V), and arsenite, As(III), are the common inorganic arsenic species present in the environment. In a hand pumped wells that have highly oxygenated water, such as those located in rural areas, As(V) is usually present, whereas toxic As(III) is mainly present in anaerobic underground water. The removal of $As^{3+}$ is usually performed by oxidizing $As^{3+}$ to $As^{5+}$ because $As^{3+}$ has low affinity for adsorbents and is consequently less efficiently removed by adsorption processes. $As^{5+}$ can then be removed by adsorption. Recently an yttrium-manganese binary metal oxide adsorbent exhibiting excellent $As^{5+}$ adsorption capacity over a wide pH range was reported, as has the performance of Mg—Ca-based LDH adsorbents for arsenate and phosphate. Further efforts towards water-treatment nanostructures and/ or LDHs warrant mention.

US 2013/0129592 A1 by Kim et al. (Kim) discloses a yttrium hydroxycarbonate modified with a heterogeneous metal, a filter device or an adsorbent for a heavy metal including the same, and a method of preparing the same. Kim's modified yttrium hydroxycarbonate may have a pore size distribution with a pore diameter peak of less than or equal to 10 nm. Kim's heterogeneous metal is a metal other than yttrium (Y) and may be a transition element, rare earth element, alkali metal, alkaline-earth metal, Group 14 element (IUPAC periodic table), Period 4 metal, or combination thereof. Kim's yttrium hydroxycarbonate may include, e.g., Ti, V, Mn, Cr, Fe, Co, Ni, Ca, Mg, and/or Si, in an amount of 1 to 20 wt. % of the total weight. Kim's material may have shapeless structure, i.e., irregular and unsymmetrical, and may include particles of an average diameter of 10 to 30 nm, and pores having an average size of 5 to 200 nm. Kim exemplifies Ti as the dopant for its yttrium hydroxycarbonate, dissolved in water as $Ti_2(SO4)3$, with $YCl_3$ and urea, at a pH of 6.5, and heated to 95° C., to precipitate Kim's formless material, which is then filtered and washed. Kim does not disclose organized structures of its material, nor particularly CaY-LDHs, much less nanosheets of yttrium-calcium-carbonate.

US 2013/0316898 A1 by De Leij et al. (De Leij) discloses composite adsorbent materials, and in particular, highly porous carbon-based composite materials for the adsorption and stabilization of inorganic substances. De Leij's composite adsorbent material comprises a porous carbon carrier matrix and an adsorbent species, wherein the adsorbent species is precipitated within the pores of the carrier matrix. De Leij discloses uses of such adsorbent materials, for example in water purification, recovery of metals from waste streams and remediation applications, and amending the adsorbent material into soil, waste, etc. to break pollutant-receptor linkages. However, De Leij uses a carbon matrix, e.g., comprising or derived from a cellulosic precursor material, preferably a ligno-cellulosic precursor material, plant material, compost, etc., which may encapsulate an adsorbent species. De Leij discloses several adsorbent materials, including Cu—$SiO_4$, Al—Mg, and Fe—Mg, but not Y—Ca—$CO_3$, nor nanostructures thereof.

U.S. Pat. No. 4,752,397 to Sood (Sood) discloses a process for purifying an aqueous solution containing heavy metal ions including passing the impure solution through a bed of activated adsorbent containing at least 20 wt. % activated hydrotalcite formed by reacting activated magnesia with an aqueous solution containing aluminate, carbonate, and hydroxyl ions. Heavy metal ions are removed from the impure aqueous solution by adsorption onto the activated hydrotalcite-containing adsorbent. Sood's adsorbent may be regenerated and the adsorbed metals recovered by subsequently stripping the metal ions from the adsorbent and recycling the metal ions back to the process of origin. Sood's adsorbent has a formula $6MgO.Al_2O_3.CO_2. 12H_2O$, $Mg_6Al_2(OH)_{1-6}CO_3O.4\ H_2O$, or other hydrotalcite-like materials with varied ratios of magnesium to aluminum. Sood discloses neither yttrium, nor calcium, nor carbonates of either, nor the combination of Y—Ca in nanostructured LHDs.

JP 5323218 B2 by Yasunobu et al. (Yasunobu), also published as JP 2012-152735 A, discloses a method for removing heavy metal ions from a liquid containing heavy metals ions using a separable photocatalyst by depositing heavy metals from heavy metal ions reduced in the liquid under light irradiation without using noble metals such as platinum. The heavy metal ions are removed from the liquid containing them, by bringing the liquid containing them in contact with a cerium oxide photocatalyst prepared by adding Ca, Sr, Y, and/or La, to cerium oxide under light irradiation. The amount of the Ca, Sr, Y, and/or La added in the photocatalyst is 0.1-100, 1-50, or 5-20 mol % based on the cerium oxide. Yasunobu relies on reduction for its separation, and requires $CeO_2$, aside from failing to disclose nanostructures of Ca—Y—$CO_3$.

EP 3 192 772 A1 by Schunk et al. (Schunk) discloses a water-free metal alkoxide solution comprising metal alkyl carbonate groups, having a formula $M_x[OR_1]_y[OOCOR_2]_z$ in which $M_X$ denotes monovalent, divalent, trivalent, tetravalent, pentavalent, hexavalent, and/or heptavalent metal(s), preferably mono-, di-, tri-, and tetravalent, most preferably mono-, di-, and trivalent, [OOCO] is a carbonate group, and $R_1$, $R_2$ are C1 to C60, more preferably C1 to C20, alkyl groups carbon atoms, with x is the sum of A to G and Y+Z=A+2B+3C+4D+5E+6F+7G. If Schunk's metal species only contains a monovalent metal, the solution is formed by metal alkoxide and metal alkyl carbonate whereby the molar ratio of metal alkyl carbonate to metal alkoxide is at least 1:1, 5:1, 10:1, or 50:1. Schunk's metal alkoxide may comprise Li, Na, K, Mg, Ca, Sr, Ba, Zn, Cd, Cu, Ni, Co, Mn, Be, Zr, Fe, Al, Ga, In, Fe, Co, Mn, Cr, La, Pr, Ce, Nd, Sm, Gd, Dy, Ho, Er, Yb, Lu, Sc, Y, Zr, Ti, Hf, and/or Cr. While Schunk describes layered double hydroxides (LDHs) or hydrotalcite-like compounds, Schunk exemplifies only Mg—Al-carbonates, Mg—Al-alkoxides, Cu-carbonates, Cu—Zn-carbonates, Al—Cu—Zn-carbonates, Al—Cu—Zn—Ti-carbonates, Al—Cu—Zn—Zr-carbonates, and Cu on silica. Schunk does not explicitly disclose Y—Ca-carbonates, nor nanostructures or sheets comprising these, nor does Schunk describe removing heavy metal ions from water.

Chem. Eng. J. 2011, 166(1), 81-87 by Guo et al. (Guo) discloses an inorganic biocomposite membrane, layered double hydroxide/eggshell membrane (LDH/ESM), as adsorbent for Cr(VI) removal, in which the ESM serves as the substrate and template to immobilize the LDH formed by in situ hydrothermal crystallization. Guo shows that MgAl—$CO_3^{2-}$-LDH grown on the fibers of ESM, and the final LDH/ESM composite membrane both maintained the network structure of the ESM substrate. Guo reports that treating with an NaCl/HCl mixed solution, exchanges the interlayer $CO_3^{2-}$ anions in the LDH portion for $Cl^-$. Evaluation as an adsorbent for Cr(VI) and the effect of pH on the adsorption showed that the MgAl—$Cl^-$-LDH/ESM composite membrane had a higher adsorption capacity than the ESM and MgAl—$CO_3^{2-}$-LDH/ESM. Guo reports this to be true even when the Cr(VI) solution was not acidified, noting its relevance in wastewater treatment. Guo reports that the adsorption isotherm of MgAl—Cl⁻-LDH/ESM showed a good fit with the Langmuir isotherm model. Guo does not disclose yttrium or calcium ions, let alone a combination of these, particularly in nanosheets with carbonate ions interlayered in a hydrotalcite layered structure.

*Applied. Clay Sci.* 2014, 87, 254-259 by Rojas (Rojas) discloses layered double hydroxides as heavy metal scavengers and their intercalation with ligands for heavy metal chelation, in Ca—Al layered double hydroxides (LDHs) with a Friedel's salt layered structure and intercalated with either nitrate (Ca—Al—NO₃) or [Ca(edta)]²⁻ (Ca—Al—[Ca(edta)]). Rojas determines the acid-base buffering capacity of these solids and studies their removal behavior as a function of equilibrium concentration and pH. Rojas's solids showed high instability, $Ca^{2+}$ ions being selectively leached at pH values as high as 8. Rojas reports high affinity and large removal capacity of $Cu^{2+}$, $Cd^{2+}$, and $Pb^{2+}$ for Ca—Al—NO₃ by hydroxide precipitation. The removal capacity of Ca—Al—[Ca(edta)] was reportedly similar, though a portion of heavy metal ions was solubilized due to [Ca(edta)]²⁻ release. The heavy metal hydroxides obtained by Ca—Al LDH removal were immobilized at pH values lower than by simple alkalinization. However, Rojas does not mention yttrium ions or carbonate ions, nor any combination thereof with Ca in a nanostructure.

The chapter, "Contamination of Heavy Metals in Aquatic Media: Transport, Toxicity and Technologies for Remediation" *Heavy Metals In Water: Presence, Removal and Safety.* Ed. Sanjay Sharma, Ch. 1, RSC: 2014, pp. 1-24, by Gautam et al. (Gautam) cheap and environmentally friendly technologies for the treatment of wastewater generated at the household and up to the industrial scale for heavy metals, such as Fe, Zn, Cu, Co, Cr, Mn, Ni, Pb, Hg, Cd, and As. Gautam describes that methods like ion-exchange, membrane filtration, catalysts including photocatalysts and photocatalysis, microbe-assisted phytobioremediation and adsorption over low-cost biosorbents and nanomaterials have been developed and successfully demonstrated. Gautam describes adsorption over biomass-derived biosorbents as capable of treating wastewater on a large scale, and that several low-cost biosorbents have been synthesized and successfully applied to remove toxic metals and metalloids from wastewater. Gautam describes nanomaterials, such as magnetic nanosorbents and layered double hydroxides, as the focus for the development of novel materials with high surface area and low-cost synthesis to develop new generation super-adsorbents. However, Gautam is silent on yttrium, calcium, or their combination, let alone nanostructures with carbonates.

*J. Alloys Comp.* 2018, 768, 572-581 by Zhang et al. (Zhang) discloses a rhombic dodecahedral structure of Ca—Al-layered double hydroxides (Ca—Al-LDHs), synthesized by a two-phase solvothermal method. Zhang's Ca—Al layered double oxides (Ca—Al-LDOs) were obtained by calcinating Ca—Al-LDHs at 600° C., which maintained the rhombic dodecahedral structures well. Zhang's Ca—Al-LDOs reportedly exhibited high adsorption rates and superb adsorption capacities for removal of Congo red (CR) from aqueous solution. The maximum adsorption capacities of Zhang's Ca—Al-LDOs towards CR reached to 1536.1 mg/g, higher than most of hydrotalcite-like materials. The adsorption process of Zhang's Ca—Al-LDHs and Ca—Al-LDOs fit well to the Langmuir isotherm and pseudo-second-order model. The adsorption mechanism was dominated by electrostatic adsorption, ion exchange, hydrogen bonding interactions, and surface complexation. However, Zhang's materials do not contain yttrium in any appreciable amount, nor do they combine Ca with Y and $CO_3^{2-}$. Beyond this, Zhang does not describe removing (heavy) metals from water, but rather a high molecular weight (969.665 g/mol), charged organic azo dye, Congo Red.

In light of the above, a need remains for nanostructured materials, particularly nanosheets, preferably containing alternate metals, for low cost, scalable water treatment applications, such as metal adsorption, and methods of making such nanostructured materials.

SUMMARY OF THE INVENTION

Aspects of the invention include nanostructures, comprising: Ca(II), Y(III), and carbonate ions interlayered in a hydrotalcite layered structure. Any permutation of the features described herein may modify such inventive nanostructures, particularly the following.

Inventive nanostructures generally comprise: a first layer comprising the Ca(II) and Y(III) in an at least partially regularly arranged array; an interlayer comprising the carbonate ions; and a second layer comprising the Ca(II) and Y(III) in an at least partially arranged array, sandwiching the interlayer with the first layer.

Molar ratios of the Ca(II) to Y(III) may be in a range of from 1:8 to 8:1. The Y(III) may be a range of from 55 to 85 atom % with respect to the Ca(II). Basal d values of the layered nanostructure may be in a range of from 0.60 to 1.25 nm. The longest average dimension in plane with the layers may be in a range of from 0.75 to 10 μm.

The interlayer may comprise at least 75 mol. % carbonate ions, relative to a total amount of ions in the interlayer. The first and/or second layer may further comprise Ti(III), Sc(III), La(III), V(III), Nb(III), W(III), Mo(III), Cr(III), Fe(III), Ru(III), Os(III), Mn(III), Co(III), Rh(III), Ir(III), Ni(III), Al(III), Ga(III), In(III), Bi(III), B(III), or mixture of two or more of these. The first and/or second layer may further comprise Mg(II), Sr(II), Ba(II), or mixture of two or more of these. The Ca(II) and the Y(III) may make out at least 80 mol. % of all metal elements in the layers.

Inventive nanostructures may (further) comprise a further interlayer comprising the carbonate ions; and a further layer comprising the Ca(II) and Y(III) in an at least partially arranged array, sandwiching the further interlayer with the first or the second layer.

At least 50% of the layers, based on a total area of the layers, may have a lattice structure including lattice spacings between lattice fringes, particularly wherein the spacings have an average distance from each other in a range of from 0.225 to 0.350 nm.

Aspects of the invention provide methods of preparing a layered nanostructure, particularly a nanostructure according to any permutation of the above features. Inventive preparative methods may comprise: agitating an aqueous solution comprising Y(III), Ca(II), and carbonate ions, the solution having pH of above 7; and heating the solution in a sealed vessel to a temperature in a range of from 150 to 250° C. for a period of no more than 7 days to form the layered nanostructure in hydrotalcite form, wherein the layered nanostructure comprises a first layer comprising Y(III) and Ca(II), an interlayer comprising carbonate ions, and a second layer comprising Y(III) and Ca(II).

The Y(III) may be provided as an acetate, trifluoroacetate, formate, borate, tetrafluoroborate, oxalate, citrate, tartrate, chloride, perchlorate, chlorate, bromide, perbromate, bromate, iodide, periodate, iodate, nitrate, sulfate, or mixture of two or more of these. The Ca(II) may be provided as a bicarbonate, azide, acetate, azide, trifluoroacetate, formate, borate, tetrafluoroborate, citrate, tartrate, chloride, perchlorate, chlorate, bromide, perbromate, bromate, iodide, periodate, nitrate, nitrite, permanganate, or mixture of two or more of these.

The heating may be in a range of from 180 to 220° C. for no more than 2 days.

Aspects of the invention comprise methods of removing at least one (heavy) metal ion from a fluid with one or more of such nanostructures. Such methods may comprise: contacting one or more CaY-LDH nanostructures in any permutation described herein with a first fluid comprising a metal ion; and separating the nanostructure(s) from the first fluid to obtain a second fluid comprising less of the metal ion.

The fluid may comprise water. The metal ion may be $Cr^{+3}$, $Cd^{+2}$, $Ni^{+2}$, $Cu^{+2}$, $Zn^{+2}$, $Hg^{+2}$, $Pb^{+2}$, $As^{+5}$, or a mixture of two or more of these. The contacting may occurs for at least 5 minutes and/or no more than 24 hours.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
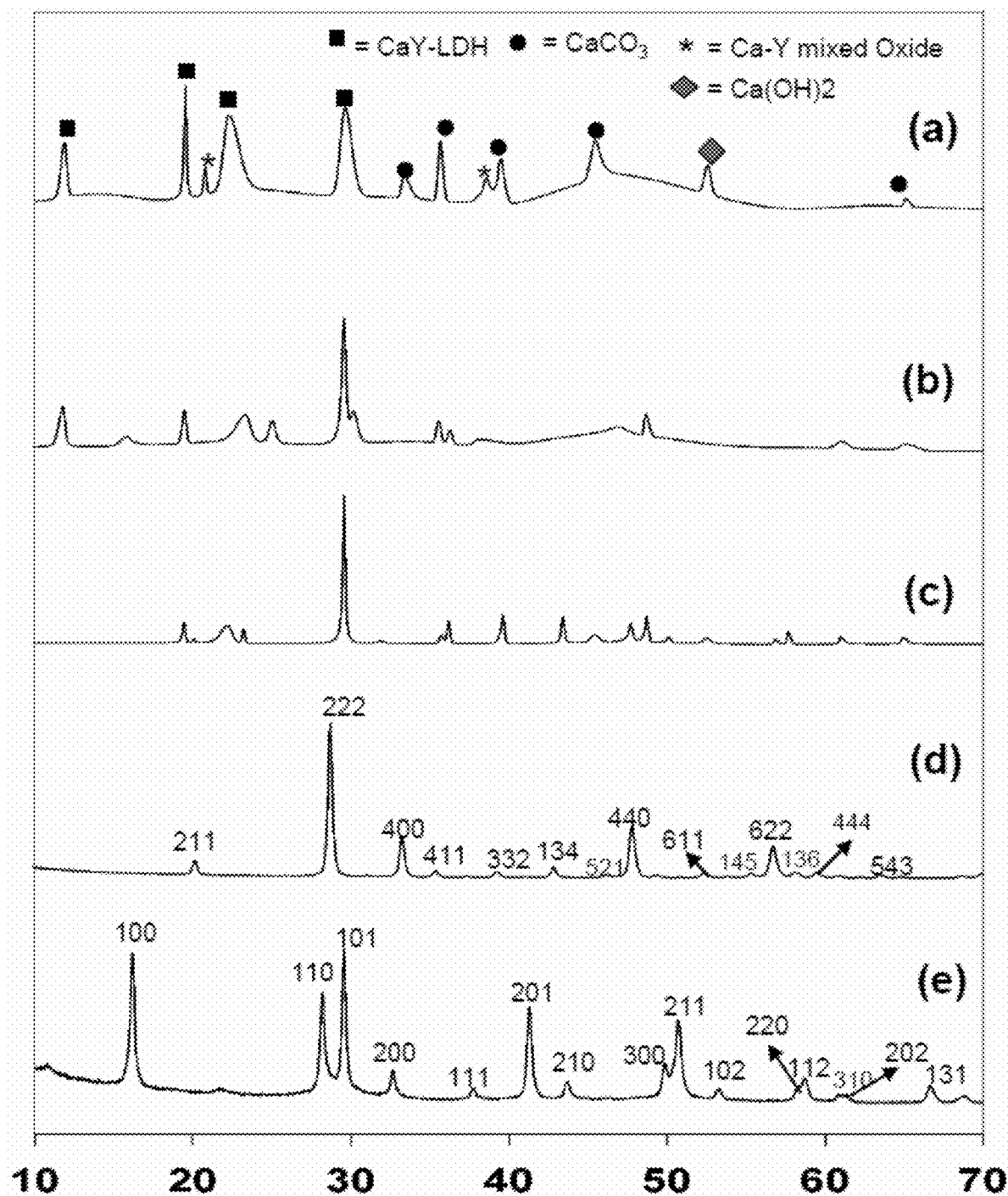
FIG. 1 shows x-ray diffraction (XRD) patterns for CaY LDH samples within the scope of the invention, prepared by a hydrothermal method at 200° C. and pH 8.5, having the Ca:Y molar ratios (a) 25:75, (b) 50:50, and (c) 25:75, as well as the XRD patterns for $Y_2O_3$ (d) and $Y(OH)_3$ (e)

Aspects of the invention include nanostructures, comprising: Ca(II) and Y(III) in nanosheets/layers, and carbonate ions interlayered generally between the Ca(II) and Y(III) containing layers, in a hydrotalcite layered structure. Such nanostructures may be modified with any permutation of the features described herein. The nanostructures, also referred to herein as layered double hydroxides (LDHs) or in hydrotalcite form, may contain 1, 2, 3, 4, 5, 6, 7, 8, 9, 10, or more layers comprising Ca(II) and Y(III), preferably 2 to 5, or 2 to 3, and a corresponding number of interlayers, whereby the interlayers should generally be sandwiched between Ca—Y layers. The term "Ca(II)," as used herein, generally means that the calcium may be present in a divalent form, i.e., either as an ion or as a (pseudo) covalently bonded species having a core metal with a formal charge of 2+, although the metal itself may not be charged. The term "Y(III)," as used herein, generally means that the yttrium may be present in a trivalent form, i.e., either as an ion or as a (pseudo) covalently bonded species having a core metal with a formal charge of 3+, although the metal itself may not be charged, such as metal oxides and/or hydroxides having a mixture of at least these two metals in particular atomic ratios.

As an example of such a structure, inventive nanostructures may comprise: a first layer comprising the Ca(II) and Y(III) in an at least partially regularly arranged array; an interlayer comprising the carbonate ions; and a second layer comprising the Ca(II) and Y(III) in an at least partially arranged array, sandwiching the interlayer with the first layer. At least 50, 65, 75, 80, 85, 90, 91, 92, 92.5, 93, 94, 95, 96, 97, 97.5, 98, 99, 99.1, 99.5, or 99.9% of the layers, based on a total area of the layers, may have a (lamellar) lattice structure including lattice spacings between lattice fringes, particularly wherein the spacings have an average distance from each other in a range of from 0.225 to 0.350, 0.250 to 0.325, 0.260 to 0.305, 0.265 to 0.300, 0.270 to 0.295, 0.275 to 0.290, or 0.280 to 0.285 nm, e.g., 283±1, 2, 3, 4 or 5 nm, or a range including any of these end points. The spacings will generally depend upon the mixture of metals used and their ratio to each other. An example of the surface of layers having such spacings is seen in the HR-TEM in FIG. 4C.

Molar ratios of the Ca(II) to Y(III) may be in a range of from 1:8 to 8:1, 1:7 to 7:1, 1:6 to 6:1, 1:5 to 5:1, 1:4 to 4:1, 1:3 to 3:1, 1:2 to 2:1, or even 1:1. The Y(III) may be a range of from 55 to 85, 60 to 82.5, 65 to 80, 70 to 77.5, or even 75 atom % with respect to the Ca(II), i.e., 3 or more Y atoms per Ca atom. Basal d values of the layered nanostructure may be in a range of from 0.60 to 1.25, 0.65 to 1.10, 0.675 to 1, 0.70 to 0.90, 0.725 to 0.8, or 0.74 to 0.76 nm, for example, at least 0.67, 0.7125, 0.733, 0.735, 0.745, or 0.75 nm and/or no more than 1.5, 1.33, 1.15, 1.05, 0.95, 0.85, 0.825, or 0.775 nm (or any of the aforementioned endpoints). The longest average dimension in plane with the layers may be in a range of from 0.75 to 10, 1 to 5, 1.25 to 4, or 1.5 to 3.5 μm. The ratio of the planar dimensions of the nanostructure flakes/sheets, may be in a range of from 1:1 to 1:10, 1:5, 1:3, or 1:2.

The interlayer may comprise at least 75, 80, 85, 90, 92.5, 95, 97.5, 98, 99, 99.1, 99.5, or 99.9 mol. % carbonate ions, relative to a total amount of ions in the interlayer, though interlayers may further comprise any of the counterions (alone or mixtures) to the metals in the solution prior to hydrothermal treatment, such as nitrate, halide, sulfate, formate, oxalate, or the like. The interlayers may further be hydrated, i.e., comprise water molecules.

The first and/or second layer may further comprise Ti(III), Sc(III), La(III), V(III), Nb(III), W(III), Mo(III), Cr(III), Fe(III), Ru(III), Os(III), Mn(III), Co(III), Rh(III), Ir(III), Ni(III), Al(III), Ga(III), In(III), Bi(III), B(III), or mixture of two or more of these, though any or all of these metals may be excluded but for inevitable traces, depending upon the desired application. The first and/or second layer may further comprise Mg(II), Sr(II), Ba(II), or mixture of two or more of these, though any or all of these metals may be excluded but for inevitable traces, depending upon the desired application. The Ca(II) and the Y(III) may make out at least 75, 80, 85, 90, 92.5, 95, 97.5, 98, 99, 99.1, 99.5, or 99.9 mol. % of all metal elements in the layers.

Inventive nanostructures may (further) comprise a further interlayer comprising the carbonate ions; and a further layer comprising the Ca(II) and Y(III) in an at least partially arranged array, sandwiching the further interlayer with the first or the second layer.

Aspects of the invention provide methods of preparing a layered nanostructure, particularly a nanostructure according to any permutation of the above features. Inventive preparative methods may comprise: agitating an aqueous solution comprising Y(III), Ca(II), and carbonate ions, the solution having pH of above 7, e.g., at least 7.5, 7.75, 8, 8.25, 8.5, 8.75, or 9 and/or no more than 13, 12, 11, 10, 9.75, 9.5, 9.25, or 9; and heating the solution in a sealed vessel to a temperature in a range of from 150 to 250, 175 to 225, 180 to 220, 190 to 210° C. and/or at least 155, 160, 165, 167, 170, 185, 195, or 200° C. and/or no more than 275, 260, 245, 233, 230, 220, 215, 205 or 200° C., for a period of no more than 7, 6, 5, 4, 3, 2, 1, or 0.5 days to form the layered nanostructure in hydrotalcite form, wherein the layered nanostructure comprises a first layer comprising Y(III) and Ca(II), an interlayer comprising carbonate ions, and a second layer comprising Y(III) and Ca(II).

The Y(III) may be provided as an acetate, trifluoroacetate, formate, borate, tetrafluoroborate, oxalate, citrate, tartrate, chloride, perchlorate, chlorate, bromide, perbromate, bromate, iodide, periodate, iodate, nitrate, sulfate, or mixture of two or more of these. The Ca(II) may be provided as a bicarbonate, azide, acetate, azide, trifluoroacetate, formate, borate, tetrafluoroborate, citrate, tartrate, chloride, perchlorate, chlorate, bromide, perbromate, bromate, iodide, periodate, nitrate, nitrite, permanganate, or mixture of two or more of these. Bicarbonate salts may allow avoidance of extra reagents. Any carbonate may also be introduced as a salt of Ca and/or Y, but preferably, due to solubility issues, as an salt of with a counterion that can be removed, e.g., as a gas, by heating, such as ammonium, or as bicarbonate. Organic cations or anions, such as pyridinium anions, pyrrolidinium anions, (aryl, aklyl, or aryalyl) sulfonates, formate, oxalate, and/or (mono, di, tri, and/or quaternary) alkyl ammonium cations, may be used, for example.

Aspects of the invention comprise methods of removing at least one (heavy) metal ion from a fluid, such as an aqueous solution or a gas (e.g., air, exhaust or other combustion off-gases, etc.) using one or more nanostructures as described herein. The ion removal methods may comprise: contacting, with a CaY-LDH nanostructure, particularly one or more nanostructures in any permutation of the features described herein, a first fluid comprising a metal ion; and separating the nanostructure from the first fluid to obtain a second fluid comprising less of the metal ion. The contacting may involve passing a stream of liquid and/or gas over a mass of the nanostructure(s), e.g., contained in a filter, coated on a contact surface, suspended in the fluid, or any other way in which the nanostructures can be contacted with the fluid, and subsequently separated with any metal ions abstracted, adsorbed, occluded, or otherwise adhered to the nanostructure(s).

The fluid may comprise water, e.g., at least 75, 80, 85, 90, 91, 92, 92.5, 93, 94, 95, 96, 97, 97.5, 98, 99, 99.1, 99.5, or 99.9 wt. % of a total weight of the fluid. The fluid may alternatively be a gas, such as air or combustion exhaust, in which water may be less than 50, 33, 25, 20, 15, 10, 7.5, 5, 2.5, 2, 1, or 0.1 wt. %, of the total fluid weight. The metal ion may be $Cr^{+3}$, $Cd^{+2}$, $Ni^{+2}$, $Cu^{+2}$, $Zn^{+2}$, $Hg^{+2}$, $Pb^{+2}$, $As^{+5}$, or a mixture of two or more of these. The contacting may occur for at least 5, 7.5, 10, 12, 15, 18, 20, 22, 24, 25, 28, or 30 minutes and/or no more than 24, 20, 18, 16, 14, 12, 10, 8, 6, 4, or 2 hours. Longer contact times may be of use in the case of gases, though the contact times should be guided by the $K_d$s and the saturation levels of the nanostructures (e.g., weight of contaminant ion for removal versus weight of nanostructure factored for the nanostructure's capacity).

Inventive materials generally contain no more than 25, 20, 15, 10, 5, 4, 3, 2, 1, 0.5, 0.1, 0.001, or 0.0001 wt. % or no more than trace detectable amounts of cerium oxide, relative to the total material weight. Inventive materials, likewise or separately, generally contain no more than 25, 20, 15, 10, 5, 4, 3, 2, 1, 0.5, 0.1, 0.001, or 0.0001 wt. % or no more than trace detectable amounts of Sr, relative to the total material weight. The amount of Ce and/or Sr may be, for example, no more than 0.1, 0.01, 0.001, or 0.0001 mol. %, relative to Ca and/or Y in inventive nanomaterials.

Inventive nanostructures may have $K_d$s with respect to $As^{5+}$ in water of at least 1, 2.5, 5, or $7.5 \times 10^5$, 1, 2.5, 5, or $7.5 \times 10^6$, or 1, 2.5, 5, or $7.5 \times 10^7$ mL/g. Inventive nanostructures may have $K_d$s with respect to $Cr^{3+}$ in water of at least 5 or $7.5 \times 10^4$, 1, 2.5, 5, or $7.5 \times 10^5$, 1, 2.5, 5, or $7.5 \times 10^6$, or $1 \times 10^7$ mL/g. Inventive nanostructures may have $K_d$s with respect to $Cu^{2+}$, $Hg^{2+}$, and/or $Cd^{2+}$ in water of at least 2.5, 5, or $7.5 \times 10^3$, 1, 2.5, 5, or $7.5 \times 10^4$, 1, 2.5, 5, or $7.5 \times 10^5$, or 1 or $2.5 \times 10^6$. Inventive nanostructures may have $K_d$s with respect to $Pb^{2+}$ and/or $Zn^{2+}$ in water of at least 1, 2.5, 5, or $7.5 \times 10^4$, 1, 1.125, 2.5, 5, or $7.5 \times 10^5$, 1, 2.5, 5, or $7.5 \times 10^6$, or $1 \times 10^7$ mL/g. Advantageously, the removal of ions from an aqueous fluid may be conducted under neutral or basic conditions, e.g., pHs of at least 7.01, 7.05, 7.10, 7.15, 7.25, 7.5, 7.75, or 8 and/or no more than 12, 11, 10, 9, 8.5, 8.25, 8, 7.75, or 7.5.

Inventive materials may generally contain no more than 25, 20, 15, 10, 5, 4, 3, 2, 1, 0.5, 0.1, 0.001, or 0.0001 wt. % or no more than trace detectable amounts of Rh, Ir, Pd, Pt, Ag, and/or Au, relative to the total material weight.

The nanostructures within the scope of the invention may avoid carbon matrices and/or comprises no more than 40, 33, 25, 20, 15, 10, 7.5, 5, 4, 3, 2, 1, 0.5, 0.1, or 0.01 wt. %, relative to the total nanostructure weight, of a carbon matrix.

Inventive $CaY—CO_3^{2-}$ LDHs may be formed by fewer than 24, 20, 18, 16, 14, 12, 10, 9, 8, 7, 6, 5, 4, 3, 2, or even 1 hour of hydrothermal treatment.

Aspects of the invention include high adsorption capacities of $CaY—CO_3$ LDH with respect to dispersed $Cr^{3+}$, $Cd^{2+}$, $Pb^{2+}$, and $As^{5+}$ ions indicating utility for, e.g., water remediation. Such removal techniques can provide an approach to, e.g., remediating environmental damage, by collecting and removing these metals from the environment, particularly from aqueous systems. Aspects of the invention involve $CaY—CO_3$ LDHs trapping any of the metal and/or metalloid ions mentioned herein rapidly even when the ions are present only at trace levels (e.g., up to 50, 40, 33, 25, 20, 15, or 10 ppm). Aspects of the invention include $CaY—CO_3$ LDHs intercalating such ion(s), particularly selectively toward arsenic and/or heavy metal ions in aqueous solution. The reduction in $Cr^{3+}$ and $As^{5+}$ concentrations from 10 ppm to 1 ppb (i.e. 3, 4, 5, 6, or 7 orders of magnitude), or otherwise below acceptable limits for drinking water, can be enabled by CaY LDHs described herein. The formation of Y—OH bonds between the intercalated $CO_3^{2-}$ and the metal ions can play a role in the effective removal of the heavy metals. Inventive materials generally have excellent chemical stability: retaining their well-defined lamellar shapes after intercalation and metal loading, even under mild acidic conditions. Such $CaY—CO_3$ LDH composite materials may be excellent candidates for (preferably rapid) decontamination of water containing heavy metals and arsenic, such as waste water, e.g., chemical plant, coal-fired plant coolant and/or contamination, environmental disaster, mining runoff, etc., desalination plants, communal water treatment plants, and the like.

Aspects of the invention include synthesizing CaY LDHs, preferably hydrothermally, by mixing $Ca^{2+}$ and $Y_2O_3$ in water and preparing micrometer-scale LDH particles that can be tailored in size and morphology. The formation of the lamellar CaY LDH structure can be influenced by the molar ratio of Ca:Y. Such CaY LDHs can be designed and implemented to remove metal and/or arsenic ions from water, even on industrial scale.

Aspects of the invention provide nanosheets comprising 2-D nanomaterials made up of $Ca^{2+}$ (Ca) and $Y^{3+}$ (Y) cations and carbonate ($CO_3^{2-}$) anions in the interlayer with a uniform diameter and lengths of several tens of microns, e.g., at least 20, 30, 40, 50, 60, 70, 80, 90, 100, 110, 120 μm, and/or no more than 2000, 1750, 1500, 1250, 1000, 900, 800, 700, 600, 500, 450, 400, 350, 325, 300, 275, or 250 μm. Such nanosheets may be synthesized in a hydrotalcite layer structure, otherwise known as a layered double hydroxide, by using a hydrothermal method. The mechanism of the formation of the lamellar $CaY—CO_3^{2-}$ layered double hydroxides (LDHs) may be influenced by the molar ratio of Ca and Y, as well as the reaction time and temperature.

Resulting $CaY—CO_3^{2-}$ LDH materials can exhibit excellent affinity and selectivity for heavy transition metal ions such as $Cr^{3+}$, $Ni^{2+}$, $Cu^{2+}$, $Zn^{2+}$, $Pd^{2+}$, $Cd^{2+}$, and $Hg^{2+}$, as well as metalloid $As^{5+}$. For toxic cations, such as $Cr^{3+}$, $Pd^{2+}$, and $As^{3+}$, the distribution coefficient, $K_d$, values can reach about 107 mL/g, for example, at least 50, 60, 75, 85, 90, 95, 100, 105, 110, or 125 mL/g and/or no more than 500, 450, 400, 350, 300, 250, 225, 200, 185, 175, 167, 160, 155, 150, 145, 140, or 135 mL/g.

Aspects of the invention include adsorption of one or more or all metal ions, especially toxic ions (to humans and/or fish and/or other marine life), from aqueous solution, with more than 75, 80, 85, 90, 91, 92, 92.5, 93, 94, 95, 96, 97, 97.5, 98, 99, 99.1, 99.5, or 99.9 wt. % of a total weight of one, several, or all of the ions, whereby the removal may be achieved within 45, 40, 35, 30, 25, 20, 15, 12, or 10 minutes. Unexpectedly, even under conditions in which all the ions were present in solution, more than 80, 85, 87.5, 90, 92.5, or 95 wt. % removal may be achieved for the 5, 6, 7, 8, 9, or 10 tested metal ions. An order of selectivity for selected ions may be: $Co^{2+}$, $Ni^{2+}$, $Zn^{2+} < Cd^{2+} << Pb^{2+} < Cu^{2+} < Hg^{2+} < As^{5+}$.

Aspects of the invention include reducing concentrations of $Pb^{2+}$, $As^{3+}$ and/or $As^{5+}$ ions within 60, 45, 30, 25, 20, 15, or 10 minutes from ppm levels to trace levels of no more than 10, 5, 4, 3, 2, 1, 0.5, 0.1, or 0.01 ppb by using an inventive CaY LDH absorbent. The adsorption process may be tailored by pH, i.e., can be pH dependent. An adsorption capacity of at least 350, 375, 400, 425, 435, 450, 455, 460, 465, or 475 (for example, 452) mg/g may be obtained at pH 7.0 for $As^{5+}$. The OH groups and the eutectic mixture of $CaO—CaCO_3—CO_2$ in the adsorbent may play a role in $As^{5+}$ removal.

EXAMPLES

Materials Preparation: Appropriate amounts of $Y(NO_3)_2 \cdot 6H_2O$ (Sigma Aldrich, 99%) and $Ca(NO_3)_3 \cdot 9H_2O$ (BDH Chemicals) were dissolved in deionized water and the pH was adjusted to 8.5 by adding 15% $(NH_4)_2CO_3$ (4.1 mol/mL, Merck, 99.99% pure). The precursor suspension was stirred for approximately 2 hours, then poured into a Teflon bottle with an inner volume of 25 mL, supported by a stainless-steel vessel. The stainless-steel vessel was sealed, and each hydrothermal reaction was performed at a temperature of 200° C. for 24 hours using a 500 mL autoclave with a magnetic stirrer (Model TPR-1, Taiatsu Techno). The contents of the vessel were then allowed to cool to room temperature. The final product was collected by filtration, then washed by centrifugation and decantation in deionized water and ethanol (Merck 99.99% pure) to remove undesirable anions. The product was dried in an oven for 24 hours at 120° C.

Materials Characterization: X-ray diffraction (XRD) patterns were recorded by using a powder X-ray diffractometer (Rigaku Miniflex with a variable slit width). A Perkin Elmer (16F PC) spectrometer was used to obtain FT-IR spectra. Electron microscopy images were collected by using a JEOL JSM-6400F field emission scanning electron microscope at an acceleration voltage of 10 kV. Each LDH sample was mounted by adding one droplet of a suspension containing the LDH onto a carbon film supported by a holder, then drying, followed by sputtering with gold. Energy dispersive X-ray spectra (EDS) were recorded with an Xmass detector, Oxford Instruments, equipped with Lyra3 TESCAN FE-SEM. TEM images were obtained by using a transmission electron microscope (JEOL, JEM 2011) with a 4 k×4 k CCD camera (Ultra Scan 400SP, Gatan) operated at 200 kV. The specific surface areas, pore volumes, and pore diameters of the LDHs were determined with the Brunauer-Emmett-Teller (BET) and Barrett-Joyner-Halenda (BJH) methods from the adsorption isotherms of $N_2$ obtained at 77 K with a NOVA-1200 apparatus. CHN analyses were conducted by using an Elementar Vario EL elemental analyzer.

An X-ray photoelectron spectrometer (XPS) equipped with an Al-Kα micro-focusing X-ray (1486.6 eV) monochromator (ESCALAB 250Xi XPS Microprobe, Thermo Scientific, USA) was utilized to investigate the chemical states and compositions of the films. The resolution of the XPS instrument was 0.5 eV. The chemical compositions of the films, obtained after dilution of a 25:75 mol % CaY sample with ethanol, deposited on glass substrates were investigated by using XPS at ambient temperature and a pressure of $5\times10^{-10}$ mbar in the specimen chamber. The spectra were referenced with respect to the adventitious C is peak at 284.5 eV. Films deposited on glass substrates were used in the XPS analysis, and an electron flood gun was used to overcome charging effects in non-conducting samples. XPS is sensitive to core level shifts and is able to provide information on the metallic environment of a species and its oxidation state. XPS measurements were performed before and after 30 seconds of ion etching to verify the actual presence of carbon. Etching was performed by using a 2 keV $Ar^+$ ion beam on a 1 $mm^2$ area of the surface, while the ion current at the sample surface was less than 1 μA.

HEAVY METAL UPTAKE EXPERIMENTS: The heavy metal uptake from aqueous solutions with various concentrations of the selected metal ions were determined by using a batch method. Similar adsorption experiments were carried out with solutions containing 0.2, 0.5, 1, 5, 10, and 20 ppm $As^{5+}$ (prepared from a standard solution of the solute: arsenic acid, $H_3AsO_4$, in $HNO_3$ at 0.5 mg/L, c(AS) of 1000±5 $mg^{-1}$, BDH Lab. Poole, BH 151TD, England). The metal ions $Co^{2+}$, $Ni^{2+}$, $Cu^{2+}$, $Zn^{2+}$, $As^{3+}$, $Pb^{2+}$, $Cd^{2+}$, and $Hg^{2+}$ were present as solutions of their nitrate salts. After mixing the solid sorbents with the solutions for a certain time for example from 10 to 100 hours, 1 to 10 days, preferably 2 to 8 days, or 4 to 6 days or about 1 week, the solution-treated sorbents were centrifuged, and the metal concentrations in the supernatant solutions were determined using inductively coupled plasma-mass spectroscopy (ICP-MS, XSE RIES-II). The adsorptive capacities were determined from the differences between the metal concentrations of the mother and supernatant solutions.

The distribution coefficient ($K_d$) is defined by Equation 1, $$K_d=(V[(C_o-C_f)/C_f])/m \qquad \text{(Eq. 1)},$$

wherein $C_o$ and $C_f$ are respectively the initial and equilibrium concentrations of $M^{n+}$ (ppm, μg/mL), V is the solution volume (mL), and m is the solid amount (g). The % removal was calculated by Equation 2:

$$100\times(C_o-C_f)/C_o \qquad \text{(Eq. 2)}.$$

The removal capacity ($q_m$) is given by Equation 3:

$$q_m=10^{-3}\times(C_o-C_f)V/m \qquad \text{(Eq. 3)}.$$

To assess the selectivities of the adsorbents for $Cu^{2+}$, $Hg^{2+}$, and $Ag^+$, experiments were carried out on solutions containing all of them together. Solutions of each ion at a concentration of ~10 ppm were mixed (~30 ppm in total) with certain quantities of the CaY LDHs (0.01 and 0.005 g). The determinations of the removal capacities for the ions $Hg^{2+}$, $Ag^+$, $Cu^{2+}$, and $Pb^{2+}$ employed various concentrations and were performed with the batch method (V/m=860-1000 mL/g) at room temperature for a contact time of 24 hours. The data obtained were used to determine the sorption isotherms.

ADSORPTION KINETIC STUDY: Kinetic experiments on the adsorption of $As^{5+}$ ions were performed for various periods (5 to 300 min). In each experiment, 0.030 g of the solid CaY LDH sample was weighed into a 50 mL centrifugal tube, and then a 30 mL aqueous solution containing the ion (20 to 30 ppm) was added (V/m=1000 mL/g). At specified time intervals, each suspension was centrifuged, and 2 mL of the supernatant solution was removed and analyzed by ICP-MS to determine the ion content. The data were processed with Plasma Lab windows platform software.

Figure 2:
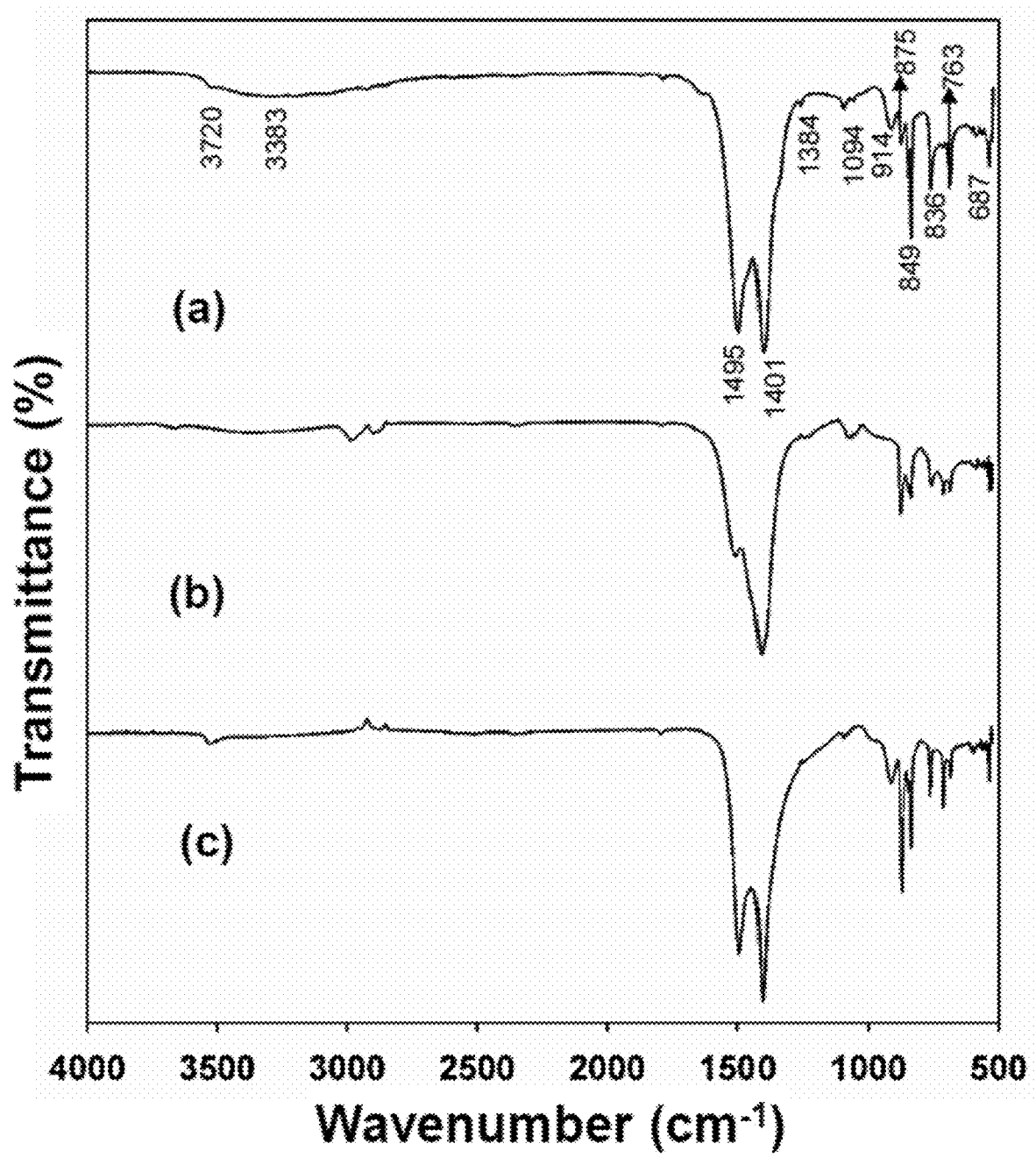
FIG. 2 shows Fourier-transform infrared (FTIR) spectra of CaY LDH samples according to the invention with the Ca:Y molar ratios (a) 25:75, (b) 50:50, and (c) 25:75.

CHEMICAL STRUCTURE OF THE ADSORBENTS: FIG. 1 shows XRD patterns for the hydrothermally prepared CaY—$CO_3^{2-}$ LDH powders synthesized at Ca:Y molar ratios of 25:75 (a), 50:50 (b), and 75:25 (c), along with XRD patterns for $Y_2O_3$ (d) and $Y(OH)_3$ (e) for comparison. The XRD patterns are discussed in more detail below. FIG. 2 shows the FT-IR spectra, discussed in more detail below, of inventive samples synthesized with Ca:Y molar ratios of 25:75 (a), 50:50 (b), and 75:25 (c).

MORPHOLOGICAL CHARACTERIZATION: The mechanism of formation of LDHs remains unclear even though LDHs exist in nature and can be readily synthesized in the laboratory. Layered double hydroxides (LDHs) or hydrotalcite-like compounds are two-dimensional anionic clay materials with general structures defined by the formula:

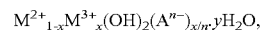

$$M^{2+}_{1-x}M^{3+}_x(OH)_2(A^{n-})_{x/n}.yH_2O,$$

wherein $M^{2+}$ and $M^{3+}$ are metal cations, A is an interlayer anion, n– is the charge on the interlayer anion, and x and y chemical formula fractional constants. LDHs comprise brucite-like layers with fractions of divalent metal cations, such as $Ca^{2+}$, $Mg^{2+}$, $Fe^{2+}$, $Co^{2+}$, $Ni^{2+}$, $Zn^{2+}$, etc., or mixtures thereof, coordinated octahedrally by hydroxyl groups partially replaced by trivalent metal cations, such as $Y^{3+}$, $Al^{3+}$, $Cr^{3+}$, $Ga^{3+}$, $In^{3+}$, $Mn^{3+}$, $Fe^{3+}$, etc., or mixtures thereof, to give positively charged layers. Water, exchangeable inorganic ions (e.g., $CO_3^{2-}$), and/or organic anions are generally present in an interlayer. LDHs allow incorporation into their lattice a variety of different metals in the brucite layers and suitable anions in the interlayer has increased the interest in these materials.

Previous studies have suggested three different types of mechanisms for the formation of LDHs. A first proposed mechanism, a "dissolution-crystallization process," based on observed $Mg^{2+}$ and $Al^{3+}$ titration performance, hypothesizes that the precipitation proceeds in two steps, obtaining a poorly crystallized LDH material, which can be converted into a well-crystallized LDH product by subsequent aging. This dissolution-crystallization process is supported by further work, considering the effect of thermostatic environment on LDH crystallization, which indicates that the agglomeration occurring during the first stage is amorphous, whereas subsequent reactions produce a layered structure. A second proposed mechanism involves calcining LDHs in $Na_2CO_3$ solution, whereby a topotactic mechanism for LDH formation is hypothesized based on SEM observations. A third proposed mechanism hypothesizes that LDH growth occurs directly on the surface of $Mg(OH)_2$, with a mechanism similar to a dissolution-crystallization process. Evidence of this third proposed mechanism was found in a mixed suspension of $Mg(OH)_2$ and aluminum hydroxycarbonate.

These three different mechanisms have been postulated based on results obtained under different experimental conditions, which indicates the complexity of the LDH formation process.

Heavy metal ion and arsenic uptake capacity of $CaY$—$CO_3^{2-}$ LDHs: The assessment of the capacity of $CaY$—$CO_3^{2-}$ LDHs to remove heavy metal ions and arsenic from water was performed by using the batch method at room temperature. These experiments were conducted with various concentrations of the ions. The capacity of $CaY$—$CO_3^{2-}$ LDHs to adsorb these ions was evaluated in terms of the distribution coefficient $K_d$. Two types of adsorption experiments were carried out: (1) individual solutions of $Cr^{3+}$, $Cd^{2+}$, $Ni^{2+}$, $Cu^{2+}$, $Zn^{2+}$, $Hg^{2+}$, $Pd^{2+}$, and $As^{5+}$, and (2) solutions containing all eight ions.

Table 1 shows the results for the adsorption of individual ions by $CaY$—$CO_3^{2-}$ LDHs.

TABLE 1

Adsorption results of inventive CaY-$CO_3^{2-}$ LDHs toward individual ions (10 ppm)[a,b]

| Element | $C_0$ (ppm) | $C_f$ (ppm) | Initial pH | pH 24 h | Removal % | $q_m$ (mg/g) | Kd (mL/g) |
|---|---|---|---|---|---|---|---|
| Cr | 10.11 | 0.030 | 6.22 | 7.20 | 99.703 | 10.08 | 3.36 × 10⁵ |
| Ni | 10.56 | 0.350 | 5.86 | 7.63 | 96.68 | 10.21 | 2.92 × 10⁴ |
| Cu | 11.00 | 0.300 | 6.18 | 7.47 | 97.27 | 10.70 | 3.57 × 10⁴ |
| As | 10.65 | 0.010 | 6.90 | 7.92 | 99.90 | 10.64 | 1.06 × 10⁶ |
| Cd | 10.69 | 0.400 | 7.10 | 7.50 | 96.25 | 10.29 | 2.57 × 10⁴ |
| Hg | 9.89 | 0.506 | 6.50 | 7.65 | 94.88 | 9.384 | 1.85 × 10⁴ |
| Pb | 10.65 | 0.060 | 6.30 | 7.04 | 99.43 | 10.59 | 1.77 × 10⁵ |
| Zn | 10.02 | 0.08 | 6.80 | 7.12 | 99.20 | 9.92 | 1.24 × 10⁵ |

[a]ion concentration: 10 ppm; contact time: 8 hours.
[b]volume = 30 mL; m (mass of solid sample) = 0.03 g; V/m = 1000.

The capacity of inventive $CaY$—$CO_3^{2-}$ LDHs to adsorb $As^{5+}$, $Cr^{2+}$, and $Pb^{2+}$ is greater than for other ions. Nearly 100% removal was achieved after 8 hours of contact time, i.e., the concentrations of these ions decreased from starting values of ~10 ppm to ≤1 ppb after this time. $K_d$ values greater than 105 mL/g (e.g., at least 150, 200, 250, 500, 750, 1000, 1250, 1500, 1750, or 2500 mL/g) were obtained for $As^{5+}$, $Cr^{3+}$, and $Pb^{2+}$ within 8 hours; calculated from the distribution coefficient ($K_d$) defined by the equation, $K_d=(V$ [$(C_0-C_f)/C_f$])/m, where $C_o$ and $C_f$ are the initial and equilibrium concentrations respectively of $M^{n+}$ (ppm, μg/mL), V is the solution volume (mL), and m is the solid amount (g). The % removal was calculated with the following equation: $100\times(C_o-C_f)/C_o$. The removal capacity ($q_m$) is given by the equation: $q_m=10^{-3}\times(C_o-C_f)$ V/m.

These results contrast with those for $Ni^{2+}$ and $Cu^{2+}$, which had $K_d$s approximately one order of magnitude lower. The capacity of $CaY$—$CO_3^{2-}$ LDHs to adsorb $Hg^{2+}$ and $Cd^{2+}$ was also low, which may be a good indication for separating these ions with the inventive LDHs.

Table 2, below, shows the percentages of removal of all eight ions from a combined solution (i.e., "the mixed ion state"). The order of selectivity for these ions is as follows: $Ni^{2+}<Cr^{3+}<Pb^{2+}<Cu^{2+}<As^{5+}<Hg^{2+}<Cu^{2+}$.

TABLE 2

Adsorption results of inventive CaY-$CO_3^{2-}$ LDHs toward eight mixed ions[a,b]

| Element | $C_o$ (ppm) | $C_f$ (ppm) | Removal % | $K_d$ (mL/g) |
|---|---|---|---|---|
| Cr | 10.25 | 0.987 | 90.37 | 9.39 × 10³ |
| Ni | 10.65 | 1.500 | 85.91 | 6.10 × 10³ |
| Cu | 10.98 | 0.978 | 91.09 | 1.02 × 10⁴ |
| As | 10.87 | 0.999 | 90.81 | 9.88 × 10³ |
| Cd | 11.25 | 1.200 | 89.33 | 8.38 × 10³ |
| Hg | 10.96 | 0.985 | 91.01 | 1.01 × 10⁴ |
| Pb | 9.89 | 0.967 | 90.23 | 9.23 × 10³ |
| Zn | 10.30 | 0.97 | 90.58 | 9.62 × 10³ |

[a]ion concentration: 10 ppm; contact time: 24 hours.
[b]volume = 30 mL; m (mass of solid sample) = 0.03 g; V/m = 1000; pH: 3.70 → 6.10

After the initial 8 hours or full contact time, the pH increases, which is probably due to the carbonate content ($HCO_3^-$) of limestone, i.e., $CaCO_3$ in the LDH, that gives buffer capacity (alkaline conditions) to the sample. Similar observations have been reported in the art, indicating that the presence of calcite buffers the pH. Adding limestone to an acidic aqueous solution starts neutralizing acids and can increase dissolved calcium concentrations. The fact that $CaY$—$CO_3^{2-}$ exhibits the highest removal of heavy metals may be due to a combination of effects, such as the presence of $Y(OH)_2$, $CaCO_3$, and/or the LDH interlayer. As mentioned above, dissolved calcium carbonate can increase the pH of the pre-LDH solution above the solubility point of the nanostructure. As a result, the metals are likely to precipitate as metal oxides or carbonates.

$K_d$ values on the order of ~104 to 105 mL/g arise only for extraordinary adsorbents. Thus, $CaY$—$CO_3^{2-}$ LDHs according to the invention can remove arsenic (As) present at trace levels and from highly concentrated solutions with unexpectedly outstanding efficiency. The adsorption capacities of $CaY$—$CO_3^{2-}$ LDHs for $As^{5+}$ over the concentration range of 1 to 10 ppm are shown in Table 3, below. Above 99.9% removal was achieved in all cases with a maximum adsorption capacity of ~500 mg/g.

TABLE 3

Adsorption results of CaY-$CO_3^{2-}$ LDHs toward $As^{5+}$ at various concentrations [a]

| Sample No. | $C_0$ (ppm) | $C_f$ (ppm) | Initial pH | pH 24 h | Removal % | $q_m$ (mg/g) | Kd (mL/g) |
|---|---|---|---|---|---|---|---|
| 1 | 1.001 | 0.00227 | 2.11 | 2.07 | 99.77 | 0.99873 | 4.40 × 10⁵ |
| 2 | 3.777 | 0.00727 | 2.15 | 2.03 | 99.81 | 3.76973 | 5.19 × 10⁵ |
| 3 | 7.543 | 4.007 | 2.10 | 2.03 | 46.88 | 3.53622 | 8.82 × 10² |
| 4 | 2.615 | 0.00834 | 5.13 | 5.02 | 99.68 | 2.60666 | 3.13 × 10⁵ |

TABLE 3-continued

Adsorption results of CaY-$CO_3^{2-}$ LDHs toward $As^{5+}$ at various concentrations [a]

| Sample No. | $C_0$ (ppm) | $C_f$ (ppm) | Initial pH | pH 24 h | Removal % | $q_m$ (mg/g) | Kd (mL/g) |
|---|---|---|---|---|---|---|---|
| 5 | 2.287 | 0.01073 | 7.12 | 7.03 | 99.53 | 2.27627 | $2.12 \times 10^5$ |
| 6 | 1.829 | 0.02926 | 9.35 | 9.02 | 98.40 | 1.79974 | $6.15 \times 10^5$ |

[a] volume =30 mL; m (mass of solid sample) = 0.03 g; V/m = 1000; contact time: 24 hours The effect of pH on the removal of various concentrations of $Cr^{3+}$, $Cd^{2+}$, $Ni^{2+}$, $Cu^{2+}$, $Zn^{2+}$, $As^{5+}$, $Hg^{2+}$, and $Pd^{2+}$ from the sample solutions, as shown below in Tables 4 to 10, in which each experiment was conducted at a volume of 30 mL, a solid sample mass (m) of 0.03 g, V/m of 1000, for a contact time of 24 hours.

TABLE 4

Adsorption results of CaY-$CO_3^{2-}$ LDHs toward $Cr^{3+}$ at various concentrations

| Sample No. | $C_0$ (ppm) | $C_f$ (ppm) | Initial pH | pH 24 h | Removal % | $q_m$ (mg/g) | Kd (mL/g) |
|---|---|---|---|---|---|---|---|
| 1 | 1.002 | 0.0006 | 2.11 | 2.50 | 99.94 | 1.0014 | $1.67 \times 10^6$ |
| 2 | 4.614 | 0.3556 | 2.15 | 2.54 | 92.29 | 4.2584 | $1.20 \times 10^4$ |
| 3 | 9.107 | 4.166 | 2.10 | 2.46 | 54.25 | 4.934 | $1.18 \times 10^3$ |
| 4 | 4.425 | 0.00116 | 5.13 | 5.00 | 99.97 | 4.42384 | $3.81 \times 10^6$ |
| 5 | 4.889 | 0.00029 | 7.12 | 7.07 | 99.99 | 4.88871 | $1.69 \times 10^7$ |
| 6 | 4.322 | 0.00057 | 9.35 | 9.00 | 99.99 | 4.32143 | $7.58 \times 10^6$ |

TABLE 5

Adsorption results of CaY-$CO_3^{2-}$ LDHs toward $Cd^{2+}$ at various concentrations

| Sample No. | $C_0$ (ppm) | $C_f$ (ppm) | Initial pH | pH 24 h | Removal % | $q_m$ (mg/g) | Kd (mL/g) |
|---|---|---|---|---|---|---|---|
| 1 | 1.052 | 0.0345 | 2.11 | 2.35 | 96.72 | 1.0175 | $2.95 \times 10^5$ |
| 2 | 4.21 | 0.669 | 2.15 | 2.54 | 84.11 | 3.541 | $5.29 \times 10^3$ |
| 3 | 7.942 | 1.005 | 2.10 | 2.46 | 87.35 | 6.937 | $6.90 \times 10^3$ |
| 4 | 4.219 | 0.312 | 5.13 | 5.00 | 92.60 | 3.907 | $1.25 \times 0^4$ |
| 5 | 4.733 | 0.6927 | 7.12 | 7.07 | 85.36 | 4.0403 | $5.83 \times 10^3$ |
| 6 | 4.746 | 0.09834 | 9.35 | 9.00 | 97.93 | 4.64766 | $4.73 \times 10^4$ |

TABLE 6

Adsorption results of CaY-$CO_3^{2-}$ LDHs toward $Ni^{2+}$ at various concentrations

| Sample No. | $C_0$ (ppm) | $C_f$ (ppm) | Initial pH | pH 24 h | Removal % | $q_m$ (mg/g) | Kd (mL/g) |
|---|---|---|---|---|---|---|---|
| 1 | 0.9914 | 0.7014 | 2.11 | 2.01 | 29.25 | 0.29 | $4.13 \times 10^2$ |
| 2 | 3.527 | 2.466 | 2.15 | 1.86 | 30.08 | 1.061 | $4.30 \times 10^2$ |
| 3 | 6.813 | 3.672 | 2.10 | 1.89 | 46.10 | 3.141 | $8.55 \times 10^2$ |
| 4 | 3.891 | 3.77 | 5.13 | 4.89 | 3.11 | 0.121 | $3.21 \times 10^1$ |
| 5 | 3.344 | 3.106 | 7.12 | 7.00 | 7.12 | 0.238 | $7.66 \times 10^1$ |
| 6 | 3.64 | 3.373 | 9.35 | 9.12 | 7.34 | 0.267 | $7.92 \times 10^1$ |

TABLE 7

Adsorption results of CaY-$CO_3^{2-}$ LDHs toward $Cu^{2+}$ at various concentrations

| Sample No. | $C_0$ (ppm) | $C_f$ (ppm) | Initial pH | pH 24 h | Removal % | $q_m$ (mg/g) | Kd (mL/g) |
|---|---|---|---|---|---|---|---|
| 1 | 0.9777 | 0.7157 | 2.11 | 1.86 | 26.80 | 0.262 | $3.66 \times 10^2$ |
| 2 | 3.537 | 2.045 | 2.15 | 1.99 | 42.18 | 1.492 | $7.30 \times 10^2$ |
| 3 | 6.519 | 3.214 | 2.10 | 1.80 | 50.70 | 3.305 | $1.03 \times 10^3$ |
| 4 | 3.782 | 0.206 | 5.13 | 5.00 | 94.55 | 3.576 | $1.74 \times 10^4$ |
| 5 | 1.861 | 0.04461 | 7.12 | 7.26 | 97.60 | 1.8163 | $4.07 \times 10^4$ |
| 6 | 2.232 | 0.6867 | 9.35 | 9.05 | 69.23 | 1.5453 | $2.25 \times 10^3$ |

TABLE 8

Adsorption results of CaY-$CO_3^{2-}$ LDHs toward $Zn^{2+}$ at various concentrations

| Sample No. | $C_0$ (ppm) | $C_f$ (ppm) | Initial pH | pH 24 h | Removal % | $q_m$ (mg/g) | Kd (mL/g) |
|---|---|---|---|---|---|---|---|
| 1 | 0.977 | 0.8673 | 2.11 | 2.03 | 11.23 | 0.1097 | $1.26 \times 10^2$ |
| 2 | 3.702 | 2.117 | 2.15 | 2.05 | 42.81 | 1.585 | $7.49 \times 10^2$ |
| 3 | 6.758 | 3.166 | 2.10 | 2.04 | 53.15 | 3.592 | $1.13 \times 10^3$ |
| 4 | 3.836 | 2.091 | 5.13 | 5.02 | 45.49 | 1.745 | $8.35 \times 10^2$ |
| 5 | 2.3 | 0.0884 | 7.12 | 7.07 | 96.16 | 2.2116 | $2.50 \times 10^4$ |
| 6 | 1.422 | 0.06778 | 9.35 | 9.03 | 95.23 | 1.3542 | $2.00 \times 10^4$ |

TABLE 9

Adsorption results of CaY-$CO_3^{2-}$ LDHs toward $Hg^{2+}$ at various concentrations

| Sample No. | $C_0$ (ppm) | $C_f$ (ppm) | Initial pH | pH 24 h | Removal % | $q_m$ (mg/g) | Kd (mL/g) |
|---|---|---|---|---|---|---|---|
| 1 | 1.493 | 0.1723 | 2.11 | 1.96 | 88.46 | 1.3207 | $7.67 \times 10^3$ |
| 2 | 1.761 | 0.4965 | 2.15 | 1.98 | 71.81 | 1.2645 | $2.55 \times 10^3$ |
| 3 | 2.962 | 1.845 | 2.10 | 1.80 | 37.71 | 1.117 | $6.05 \times 10^2$ |
| 4 | 2.434 | 1.263 | 5.13 | 5.13 | 48.11 | 1.171 | $9.27 \times 10^2$ |
| 5 | 1.516 | 0.3519 | 7.12 | 7.00 | 76.79 | 1.1641 | $3.31 \times 10^3$ |
| 6 | 0.9929 | 0.5309 | 9.35 | 9.01 | 46.53 | 0.462 | $8.70 \times 10^3$ |

TABLE 10

Adsorption results of CaY-$CO_3^{2-}$ LDHs toward $Pb^{2+}$ at various concentrations

| Sample No. | $C_0$ (ppm) | $C_f$ (ppm) | Initial pH | pH 24 h | Removal % | $q_m$ (mg/g) | Kd (mL/g) |
|---|---|---|---|---|---|---|---|
| 1 | 1.039 | 0.01421 | 2.11 | 1.86 | 98.63 | 1.02479 | $7.21 \times 10^4$ |
| 2 | 4.408 | 0.1307 | 2.15 | 1.96 | 97.03 | 4.2773 | $3.27 \times 10^4$ |
| 3 | 8.121 | 3.792 | 2.10 | 1.90 | 53.31 | 4.329 | $1.14 \times 10^3$ |
| 4 | 1.859 | 0.00051 | 5.13 | 5.01 | 99.97 | 1.85849 | $3.64 \times 10^6$ |
| 5 | 2.09 | 0.00011 | 7.12 | 7.04 | 99.99 | 2.08989 | $1.90 \times 10^7$ |
| 6 | 1.48 | 0.00037 | 9.35 | 9.06 | 99.97 | 1.47963 | $4.00 \times 10^6$ |

In most cases, reducing the pH, i.e., more acidic solutions, hinders ion removal. On the other hand, higher pH values, i.e., above 7.00, i.e., basic conditions, enhance removal. Only in the case of $As^{5+}$ (for the tested ions) is removal highly efficient over the pH range from 1.00 to 9.00 with inventive CaY—$CO_3^{2-}$ LDHs, although high effectiveness was also observed in the case of $Pd^{2+}$. The $K_d$ values for the highly toxic $Cr^{3+}$, $As^5$, and $Pd^{2+}$ can reach ~107 mL/g, as shown in Table 3, 4, and 6. The $K_d$ values for the adsorption of $Cr^{3+}$, $As^{5+}$, and $Pd^{2+}$ are higher than those of other materials reported in the art, such as KMS-2 (*Chem. Mater.* 2003, 15, 3669-3675, incorporated herein in its entirety) and LHMS ($H_{2-x}Mn_xSn_{3-x}S_6$) with $K_d$s of $10^3$ to $10^6$ mL/g (*Chem. Mater.* 2015, 27, 1925-1928, incorporated herein in its entirety), marketed resins with $K_d$s of ~$10^4$ to $5.1 \times 10^5$ mL/g (*Adv. Funct. Mater.* 2009, 19, 1087-1092, incorporated herein in its entirety), silane chelating fibers with $K_d$s of $3.0 \times 10^5$ to $3.8 \times 10^6$ mL/g (*Environ. Sci. Technol.* 2007, 41, 5114-9, incorporated herein in its entirety), and chalcogel-1 with $K_d$s of $9.2 \times 10^6$ to $1.6 \times 10^7$ mL/g (*J. Environ. Sci. Technol.* 2003, 37, 4261-68, incorporated herein in its entirety).

SORPTION ISOTHERMS FOR ARSENIC—ION UPTAKE CAPACITIES: The $CaY$—$CO_3^{2-}$ LDH materials fabricated as described herein can rapidly reduce the concentrations of heavy metals, toxic or otherwise, in aqueous solutions to low levels (ppb and sub ppb). The above results, e.g., Table 1, show that the highest selectivity of inventive $CaY$—$CO_3^{2-}$ LDHs is for $As^{5+}$.

The maximum adsorption capacities of the material were determined by performing adsorption equilibrium experiments. The removal by $CaY$—$CO_3^{2-}$ LDHs of $As^{5+}$ can be seen to increase with increasing concentration, e.g., 10 to 500 ppm. Greater than 98% removal of $As^{5+}$ was obtained over a wide range of initial concentrations, i.e., 10 to 400 ppm, with $K_d$ values ranging from $4 \times 10^4$ to $3 \times 10^7$ mL/g. That is, $K_d$s for $As^{5+}$ in inventive materials may be at least $1 \times 10^4$, $2 \times 10^4$, $3 \times 10^4$, $4 \times 10^4$, $5 \times 10^4$, $7.5 \times 10^4$, $1 \times 10^5$ mL/g and/or up to $1 \times 10^9$, $5 \times 10^8$, $1 \times 10^8$, $7.5 \times 10^7$, $5 \times 10^7$, or $2.5 \times 10^7$ mL/g.

The maximum removal capacity ($q_m$) achieved for $As^{5+}$ was ~452 mg/g, which is remarkably high when compared to those of absorbers such as those disclosed in *Science* 2007, 317, 490-493, and *Ind. Eng. Chem. Res.* 2012, 51, 454-463, each of which are incorporated in their entirety herein. Very low concentrations of $As^{5+}$, i.e., below 2.5, 2, 1.5, 1.25, 1, 0.75, 0.5, 0.25, 0.1, 0.05, or 0.01 ppb, can be achieved by contacting water with inventive materials, i.e., well below the presently acceptable level for drinking water of 2 ppb. These results indicate that inventive $CaY$—$CO_3^{2-}$ LDHs can be highly effective filters for removing toxic and/or other heavy metals and/or arsenic from water, among other fluids (air, organic solvents, ionic liquids, battery fluids, etc.).

The experimental data for $As^{5+}$ can be presented in the form of a Langmuir isotherm. Based on this model, it can be concluded that $As^{5+}$ ions form a monolayer-type coverage on the adsorbent, e.g., $CaY$—$CO_3^{2-}$ LDH, surface. As soon as an adsorption site is inaccessible or full, no more adsorption can occur at that site.

Figure 6:
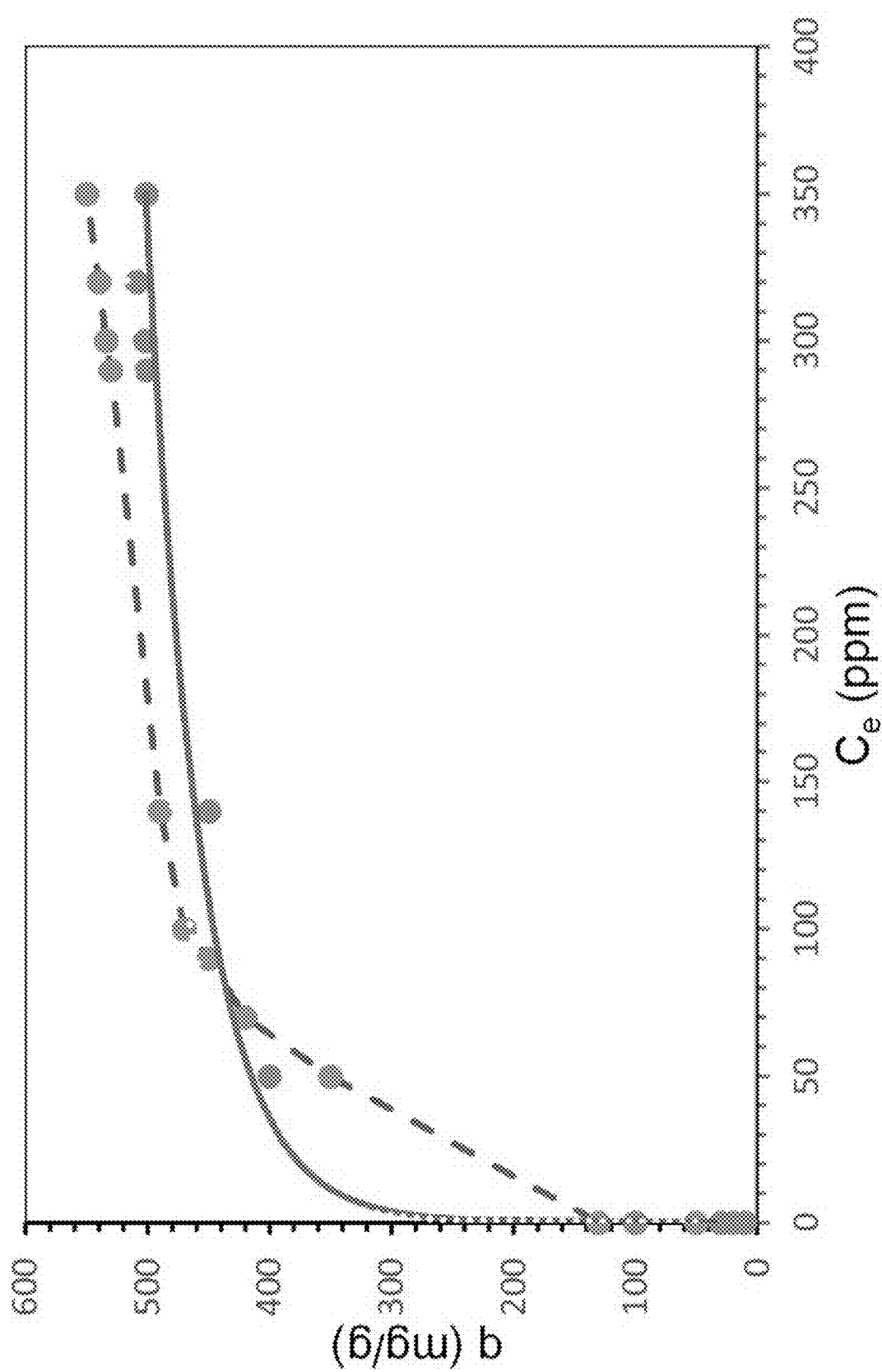
FIG. 6 shows a Langmuir equilibrium isotherm for the sorption of $As^{5+}$ by a CaY LDH samples according to the invention, derived from the $As^{5+}$ equilibrium concentration ($C_e$) and plotted against the capacity q (mg/g)

The Langmuir isotherm model is given by Equation 4:

$$q = q_m \frac{bC_e}{1 + bC_e}, \quad (Eq. 4)$$

wherein q (mg/g) is the equilibrium adsorption capacity of $As^{5+}$, $C_e$ (mg/L) is the $As^{5+}$ concentration at equilibrium, and $q_m$ (mg/g) is the theoretical maximum sorption capacity. FIG. 6 shows an equilibrium adsorption isotherm for $As^{5+}$ equilibrium concentrations ranging from 0.02 to 400 ppm, which is discussed in more detail below.

The experimental and calculated data were collected and then compared, relying on two kinetic rate equations from *Ind. Eng. Chem. Res.* 2012, 51, 454-63 (incorporated herein in its entirety). Pseudo-first-order kinetics correspond to Equation 5, below:

$$\ln(q_e - q_t) = \ln q_e - k_1 t \quad (Eq. 5); \text{ and}$$

pseudo-second-order kinetics correspond to Equation 6, below:

$$t/q_t = 1/k_2 q_e^2 + t/q_e \quad (Eq. 6),$$

wherein $q_e$ (mg/g) is the quantity of $As^{3+}$ adsorbed per unit mass of adsorbent at equilibrium and $q_t$ (mg/g) is the quantity of $As^{3+}$ adsorbed at time t, while $k_1$ (min$^{-1}$) and $k_2$ (g/mg min$^{-1}$) are the equilibrium rate constants of the pseudo-first-order and pseudo-second-order adsorption processes respectively.

Figure 7:
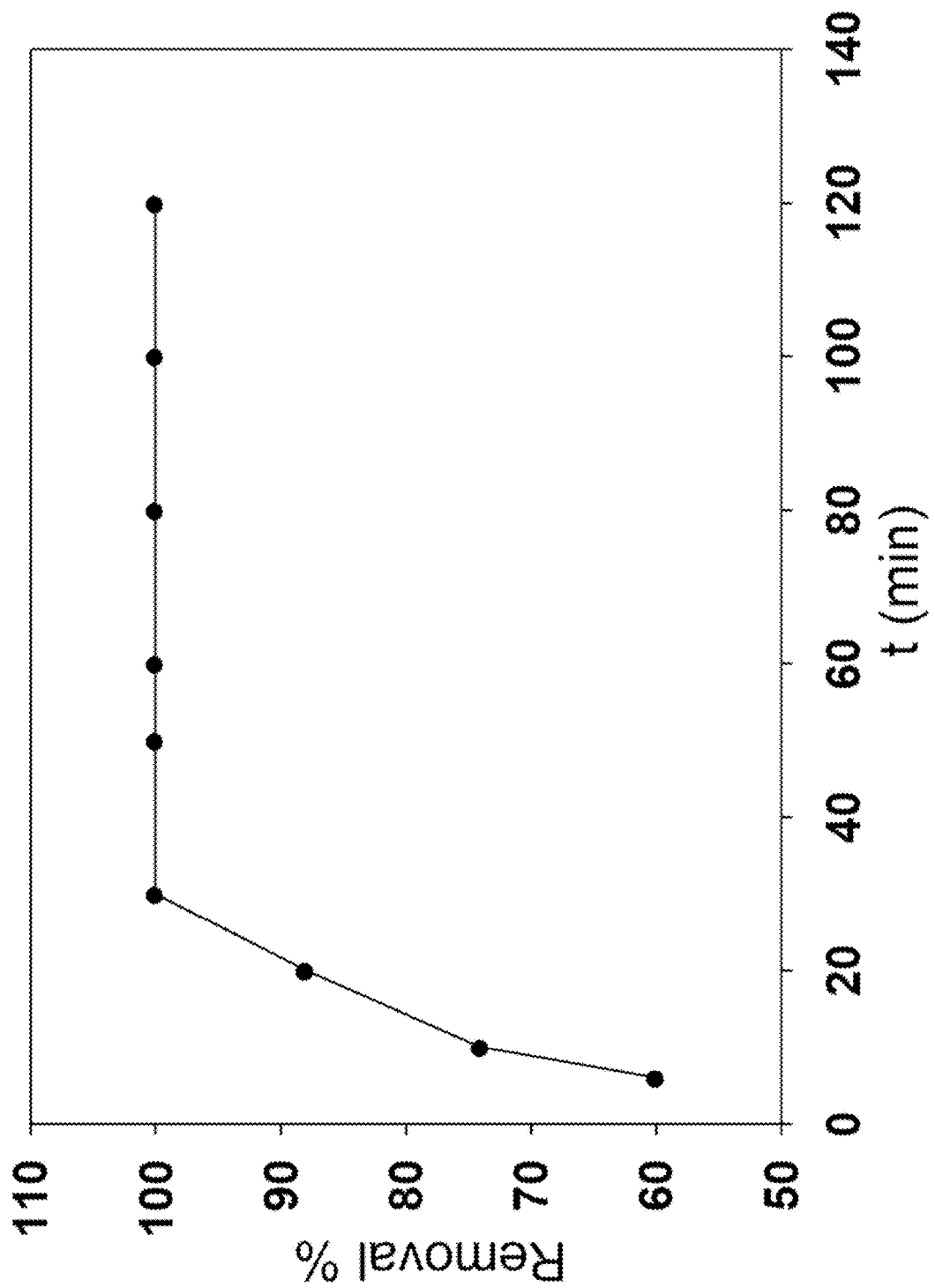
FIG. 7 shows adsorption kinetics curves for $As^{5+}$ removal % as a function of contact time.

As shown in FIG. 7, discussed below, the adsorption of $As^{5+}$ was found to be very rapid and highly selective using a CaY LDH. These findings are supported by the data in Table 3, above, as well as Table 11, below.

TABLE 11

Kinetics data of $As^{3+}$ adsorption using inventive $CaY$-$CO_3^{2-}$ LDHs [a]

| Time (min) | $C_o$ (ppm) | $C_f$ (ppm) | Removal % | $q_t$ (mg/g) | $K_d$ (mL/g) |
|---|---|---|---|---|---|
| 5 | 20 | 0.73 | 96.35 | 19.27 | $2.64 \times 10^4$ |
| 30 | 20 | 0.068 | 99.66 | 19.932 | $2.93 \times 10^5$ |
| 60 | 20 | 0.049 | 99.755 | 19.951 | $4.07 \times 10^5$ |
| 120 | 20 | 0.002 | 99.99 | 19.998 | $1.00 \times 10^7$ |
| 180 | 20 | 0.0039 | 99.9805 | 19.9961 | $5.13 \times 10^6$ |
| 240 | 20 | 0.003 | 99.985 | 19.997 | $6.67 \times 10^6$ |
| 300 | 20 | 0.002 | 99.99 | 19.998 | $1.00 \times 10^7$ |

[a] ion concentration: 20 ppm; contact time: 24 hours; volume = 30 mL; mass of solid sample (m) = 0.03 g; V/m = 1000

The value of $k_1$ can be obtained by plotting $\ln(q_e - q_t)$ versus t and that of $k_2$ by plotting $t/q_t$ versus t. Table 12, below, shows the kinetic parameters for the adsorptions of $Cr^{2+}$, $As^{5+}$, $Cd^{2+}$, and $Pb^{2+}$:

TABLE 12

Kinetics data of $As^{3+}$ adsorption using inventive $CaY$-$CO_3^{2-}$ LDHs

| ion | $q_e$ | $K_2$ | $q_{e,cal}$ (mg/g) | $R^2$ |
|---|---|---|---|---|
| $Cr^{2+}$ | 18.20 | 0.30 | 19.00 | 0.97 |
| $As^{5+}$ | 22.10 | 0.371 | 22.24 | 0.98 |
| $Cd^{2+}$ | 17.00 | 0.298 | 17.47 | 0.99 |
| $Pb^{2+}$ | 16.20 | 0.28 | 16.88 | 0.99 |

As seen in Table 12, the sorption capacities ($q_{e,cal}$) calculated with the pseudo-second-order model are nearer to the corresponding experimental values ($q_{e,exp}$). The quality of fit, i.e., coefficient $R^2$, is close to 1, indicating that these ion adsorptions by CaY LDHs can be well-described with a pseudo-second-order kinetic model. That is, the adsorption process for at least these ions by $CaY$—$CO_3^{2-}$ LDHs appears to occur through chemisorption.

XPS analysis of $CaY$—$CO_3^{2-}$ LDH samples are presented in FIG. 8 to 10, discussed below in more detail, showing the compositions and chemical states of the LDH adsorbent with a molar ratio 25:75 before and after exposure to As.

Table 13, provided below, shows the atomic ratios of Y, Ca, C, O, and As in the adsorbents before and after adsorption, which were calculated based on XPS data.

TABLE 13

Kinetics data of $As^{3+}$ adsorption using inventive $CaY\text{-}CO_3^{2-}$ LDHs

| atomic ratio (%) | Y | Ca | O | C | As |
|---|---|---|---|---|---|
| virgin (LDH) adsorbent | 17.42 | 1.15 | 65.85 | 15.57 | — |
| arsenic-loaded adsorbent | 19.74 | 0.78 | 62.38 | 14.16 | 2.94 |

After the adsorption, the atomic percentage of arsenic on the surface increases from 0% to 3.54%, indicating that arsenate can be adsorbed by inventive $CaY\text{-}CO_3$ composites. The atomic fraction of O decreases after adsorption, which might be due to the replacement of hydroxyl and/or carbonate groups on the surface of the adsorbent with arsenate ions.

In fact, arsenic adsorption appears to occur via the development of surface complexes through the replacement of hydroxyl groups with arsenic ions. In addition, the adsorption process is affected by the carbonate groups (or any other ion or dopant, e.g., $ClO_4^-$, $ClO_3^-$, $PO_4^{3-}$, $IO_4^-$, $IO_3^-$, $C_2O_4^{2-}$, $OCN^-$, $SCN^-$, $(BO_3)^{3-}$, $F^-$, $HCO_2^-$, $CH_3CO_2^-$, or a mixture thereof, in the interlayer) and also partly by electrostatic interactions. FIG. 6 shows experimental data that can be fitted to adsorption isotherms obtained by Langmuir and Freundlich models. According to the parameters listed in Table 12, the fitting with the Langmuir model has a higher correlation coefficient ($R^2$=0.98) than that obtained with the Freundlich model ($R^2$=0.95), indicating that the Langmuir model is appropriate for the adsorption of As(V).

In aqueous solution, the $Ca^{2+}$, $HCO_3^-$, and/or $CO_3^{2-}$ ions, all are dissolved with $CO_2$. In fact, the presence of $CaCO_3$, $Y(OH)_3$, and $CO_3^{2-}$ are considered to be key factors in the high removal rate of the inventive LDHs. Intercalation and precipitation may play important roles in the removal of toxic heavy metal ions. Adsorption by CaY LDH arises through intercalation into the interlayer spaces and precipitation of dissolved $Ca^{2+}$ with anions. As(V) at concentrations below 10 mg/L is almost completely removed through intercalation into the interlayers of the reconstructed CaY LDH. Less than 0.010 mg/L As was found remaining in the solution.

Figure 11A:
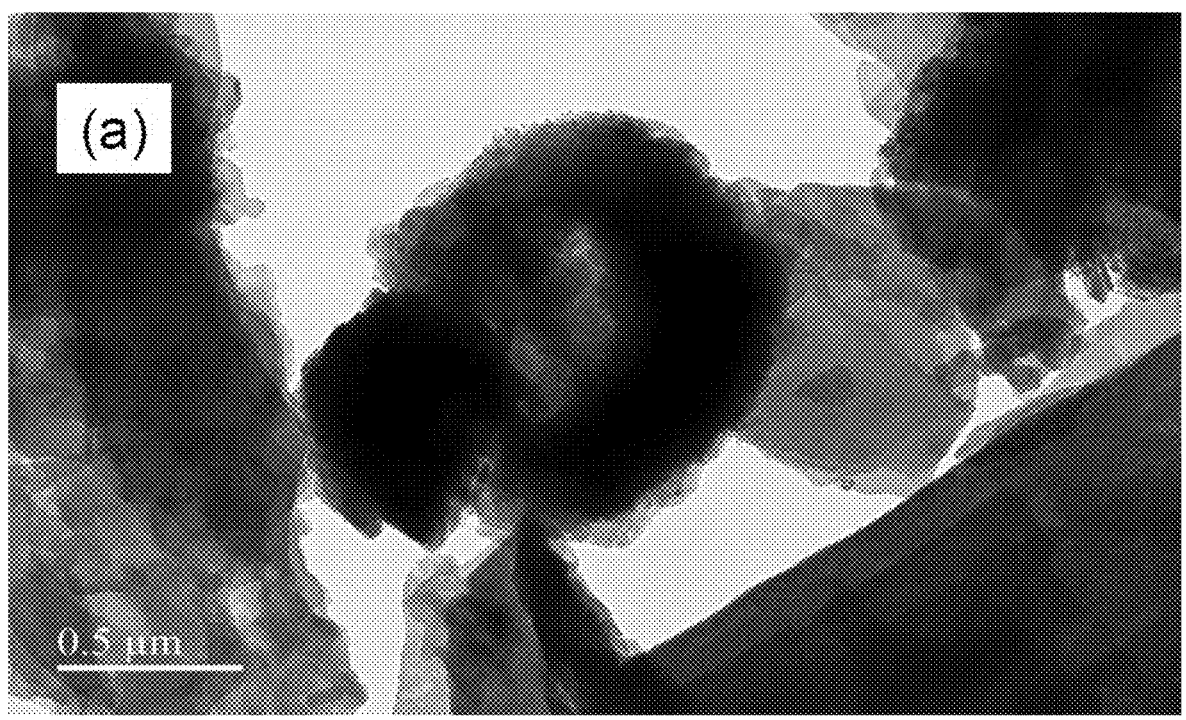
FIG. 11A shows a TEM image at low magnification of a solid CaY LDH sample according to the invention after the adsorption of 10 ppm $As^{5+}$.

Previous studies of manganese removal from water by limestone ($CaCO_3$) particles demonstrated that limestone is capable of removing more than 90% of heavy metals from 2 mg/L solutions at pH 8.5. There is further (additional or alternate) possibility that eutectic mixtures of $CaCO_3$—$CaO$—$Ca(OH)_2$ and/or $CaCO_3$—$CaO$—$Y(OH)_3$ form, which could play a role in the removal of metal ions. XPS and TEM observations were also conducted after the adsorption of the metal ions, as shown in FIGS. 11A and B, from solid samples collected from suspensions by centrifuging, then drying.

Figure 12A:
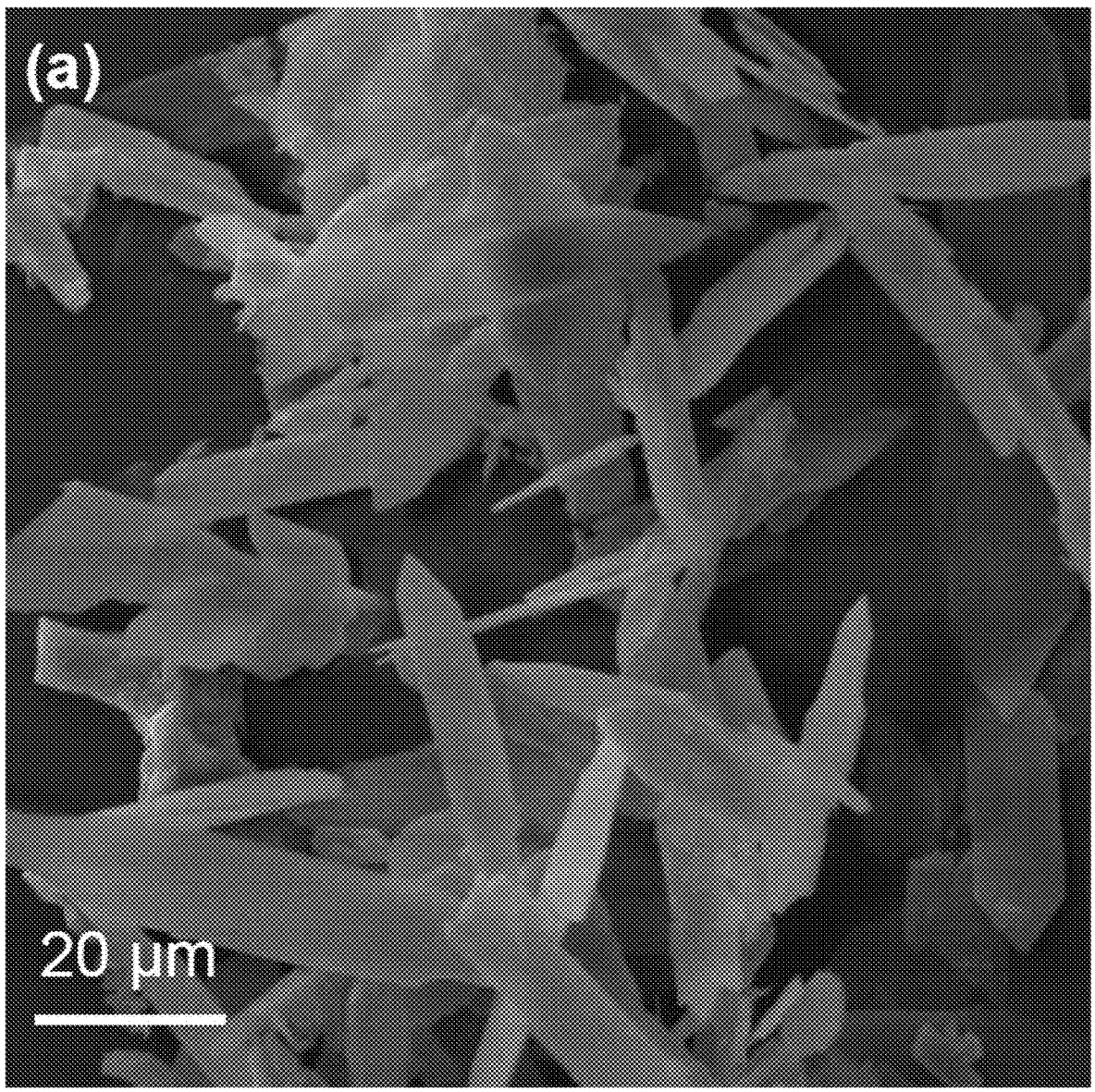
FIG. 12A shows an SEM image of a CaY LDH sample within the scope of the invention, having a Ca:Y molar ratio of 25:75, prepared using a hydrothermal method for 36 hours at 200° C.
Figure 12B:
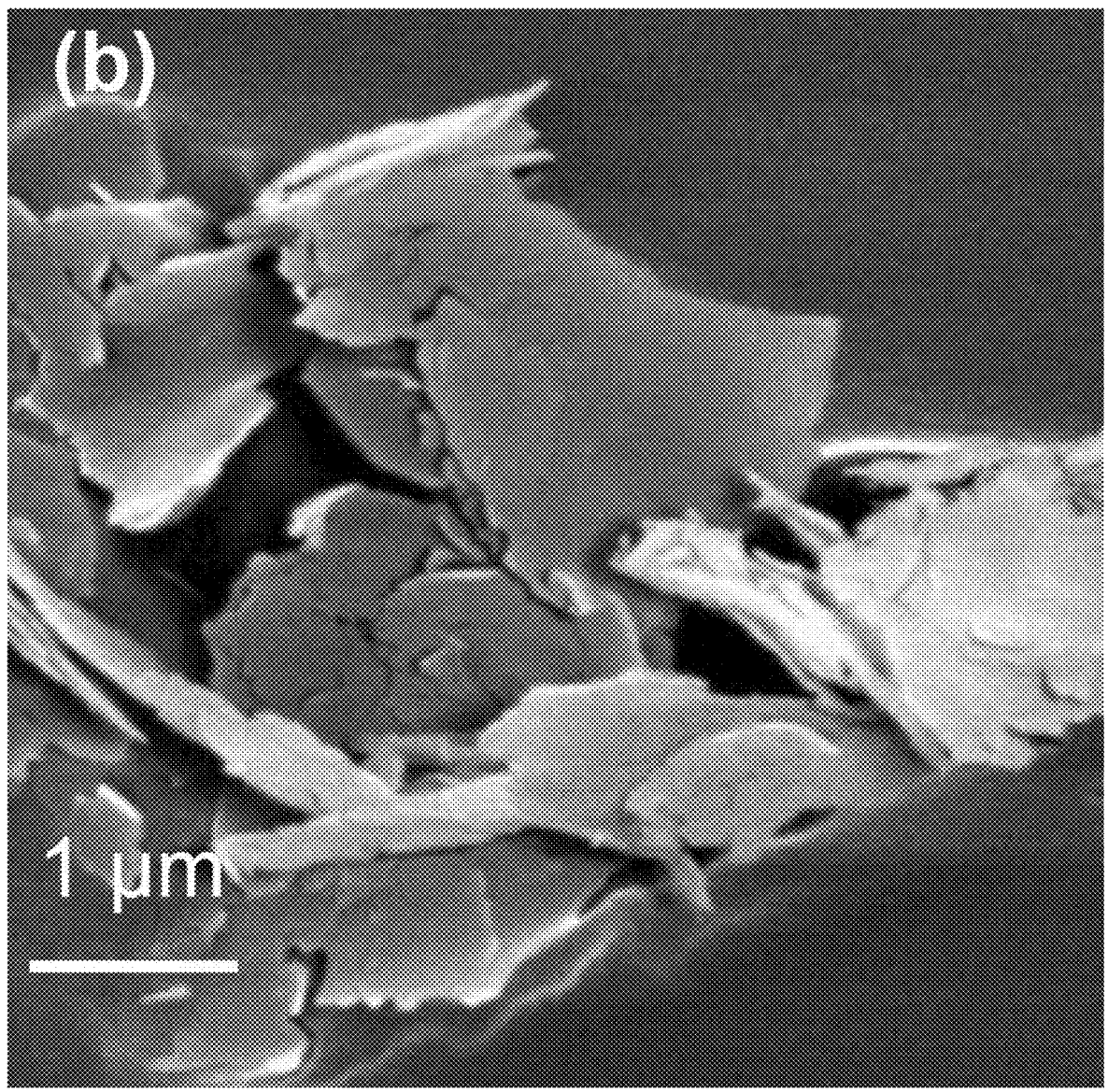
FIG. 12B shows an SEM image of CaY LDH samples within the scope of the invention, having a Ca:Y molar ratio of 25:75, prepared using a hydrothermal method for 12 hours at 200° C.
Figure 12C:
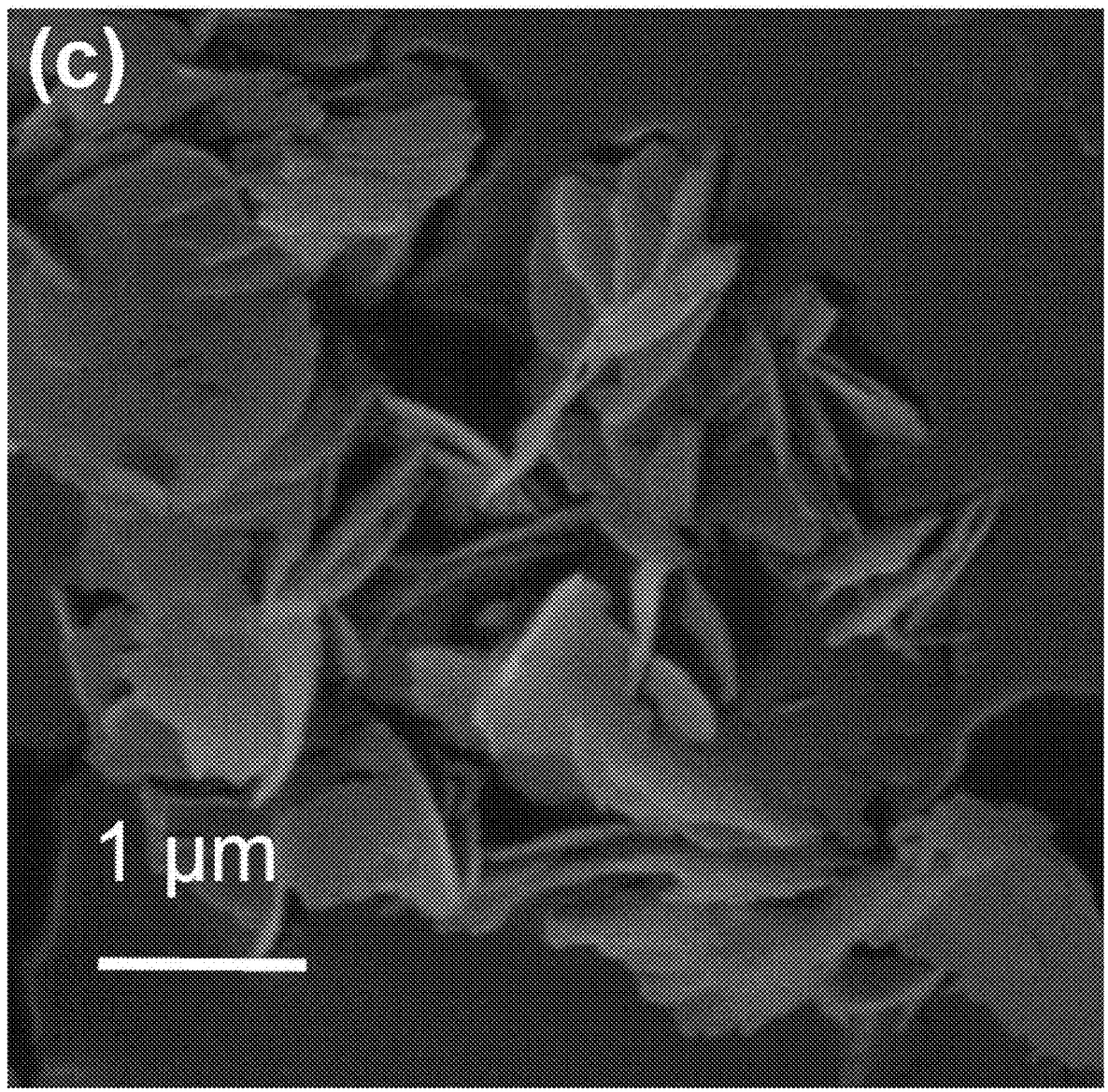
FIG. 12C shows an SEM image of CaY LDH samples within the scope of the invention, having a Ca:Y molar ratio of 25:75, prepared using a hydrothermal method for 12 hours at 120° C.

The hydrothermal reaction time and/or reaction temperature in forming LDHs according to the invention can be varied to optimize the morphology of CaY LDH and ensure the preparation of single-phase materials, as seen in FIG. 12A to C.

Referring now to the drawings, wherein like reference numerals designate identical or corresponding parts throughout the several views.

FIG. 1 shows XRD patterns for the samples of the hydrothermally prepared $CaY\text{-}CO_3^{2-}$ LDH powders made according to the above description were collected with Cu-Kα radiation at room temperature, with a scan time of 20 seconds per step and 2θ values ranging from 5 to 800. The XRD patterns are of $CaY\text{-}CO_3^{2-}$ LDH samples synthesized by using Ca:Y molar ratios of 25:75 (FIG. 1a), 50:50 (FIG. 1b), and 75:25 (FIG. 1b), and the XRD patterns for $Y_2O_3$(FIG. 1d), and $Y(OH)_3$ (FIG. 1e) are included for comparison. The diffraction pattern for the $CaY\text{-}CO_3^{2-}$ LDH indicates that it has a typical layered structure with a basal d-value of 0.76 nm, which is similar results to previous previously reported. The sharp peaks throughout indicate that the samples are crystalline. Peaks corresponding to the (003), (006), (018), (012) (111), (110), and (113) planes are characteristic of clay minerals (LDHs) with layered structures.

The XRD patterns of the $CaY\text{-}CO_3^{2-}$ LDHs (spectra "a" and "b") are identical to those in JCPDS file No. 38-0487. FIGS. 1(a) and (b) show that mixed phases are present in the LDHs, which corresponds to reports on LDH materials with mixed phases elsewhere. FIG. 1(a) to (c) show that the intensities of all the peaks of the $CaY\text{-}CO_3^{2-}$ LDHs decrease with increasing proportions of Y. The low angle diffraction peaks are indexed as (003) and (006) for a rhombohedral symmetry and are very intense and distinct for samples (a) and (b) in FIG. 1—prepared with molar ratios of 25:75 and 50:50 and 24 hour of hydrothermal treatment. FIG. 1(d) shows that the well-defined XRD pattern for $Y_2O_3$ completely disappears in the pattern for the $CaY\text{-}CO_3^{2-}$ LDH product.

The samples in FIG. 1 show the formation of a 3R2-polytype LDH phase, which rarely arises in co-precipitation syntheses. The intensities of the peaks of the 3R2-polytype LDH phase decrease with increasing yttrium content. For MgAl—OH LDHs, the intensity of the polytype peaks generally decreases after long hydrothermal treatment. The preparation of MgAl—OH LDHs is very time consuming, e.g., requiring 10 days hydrothermal treatment, which indicates that long-time aging is required for the formation of MgAl—OH LDH.

For the present invention, a different type of reaction occurs in the LDH preparation process. Particularly, the XRD peaks of CaY LDH do not persist after long hydrothermal treatment, which results in morphologies that are no longer lamellar. $CaY\text{-}CO_3^{2-}$ LDHs can be obtained with the same layered morphology as that of MgAl—OH LDHs after only 24 hours of hydrothermal reaction, or even 22, 20, 18, 16, 14, 12, 10, 8, or 6 hours.

The presence of a small amount of $Y(OH)_3$ as an impure phase in FIG. 1 or in similar $CaY\text{-}CO_3^{2-}$ LDHs may be due to the neutrality of the initial suspension. The alkalinity in the suspension retains a small amount of CaO not having undergone a reaction during the whole hydrothermal reaction period. These observations suggest that, in all samples, CaO and $Y_2O_3$ are converted respectively to $Ca(OH)_2$ and $Y(OH)_3$ during the early stages of the hydrolysis reaction. Without wishing to be bound to any theory, it is believed that under neutral conditions $Ca(OH)_2$ rapidly dissociates to $Ca^{2+}$ and OH—, which are then deposited on the surface of $Y(OH)_3/Y_2O_3$ to form a CaY pre-LDH material. In basic solution, $Y(OH)_4$ may form from $Y(OH)_3$ and then be deposited on the surface of $Ca(OH)_2/CaO$, which can eventually result in a similar CaY pre-LDH material. These pre-LDH materials can crystallize further under continuous heating by diffusion of metal ions within the solid lattice.

The above dissociation-deposition-diffusion mechanism via two routes is supported by experimental results herein for the phase composition, the morphological structures of the crystallites, and the [Ca]/[Y] ratios on the crystallite surfaces. Such a mechanism could (also) arise in the overall formation of LDHs in various synthetic methods, such as co-precipitation, homogeneous preparation, and reconstruction. FIG. 1 shows a $Ca(OH)_2$ impurity phase, which can be generated simultaneously, which $Ca(OH)_2$ phase may also be evident at 3720 cm$^{-1}$ (very weak) in FT-IR spectra of samples, e.g., FIGS. 2(a), (b), and (c), discussed below.

FIG. 2 shows the FT-IR spectra of samples synthesized with Ca:Y molar ratios of 25:75 (FIG. 2a), 50:50 (FIG. 2b), and 75:25 (FIG. 2c). A very weak peak near 3700 cm$^{-1}$ can be seen for all samples, which is due to the vibration of —OH groups in inorganic and interlayer water. The intense band at 1401 cm$^{-1}$ is due to the antisymmetric $v_3$ mode of carbonate anions and/or free carbonate species. Carbonate species probably arise through the absorption of $CO_2$ from the atmosphere during the collection process and the subsequent reaction $CO_2 + OH^- \rightarrow HCO_3^-$ or $CO_3^{2-}$ on the surface of the CaY—$CO_3^{2-}$ LDH layer sheets. The peaks at 875, 849, 836, 763, and 687 cm$^{-1}$ are the typical vibrations of M-O and M-OH (M=Ca, Y) in LDH materials. The peak at 875 cm$^{-1}$ is assigned to the $v_2$ mode of carbonate, while the other two bands arise from the loss of degeneracy of the originally doubly degenerate $v_4$ mode. The peak at 680 cm$^{-1}$ is due to free carbonate species. The observed reduction in symmetry is probably due to the interactions of carbonate anions with water molecules in the interlayer space and with hydroxyl groups. The very weak shoulder type peak at 1384 cm$^{-1}$ is probably due to the presence of the $NO_3^-$ group.

Figure 3A:
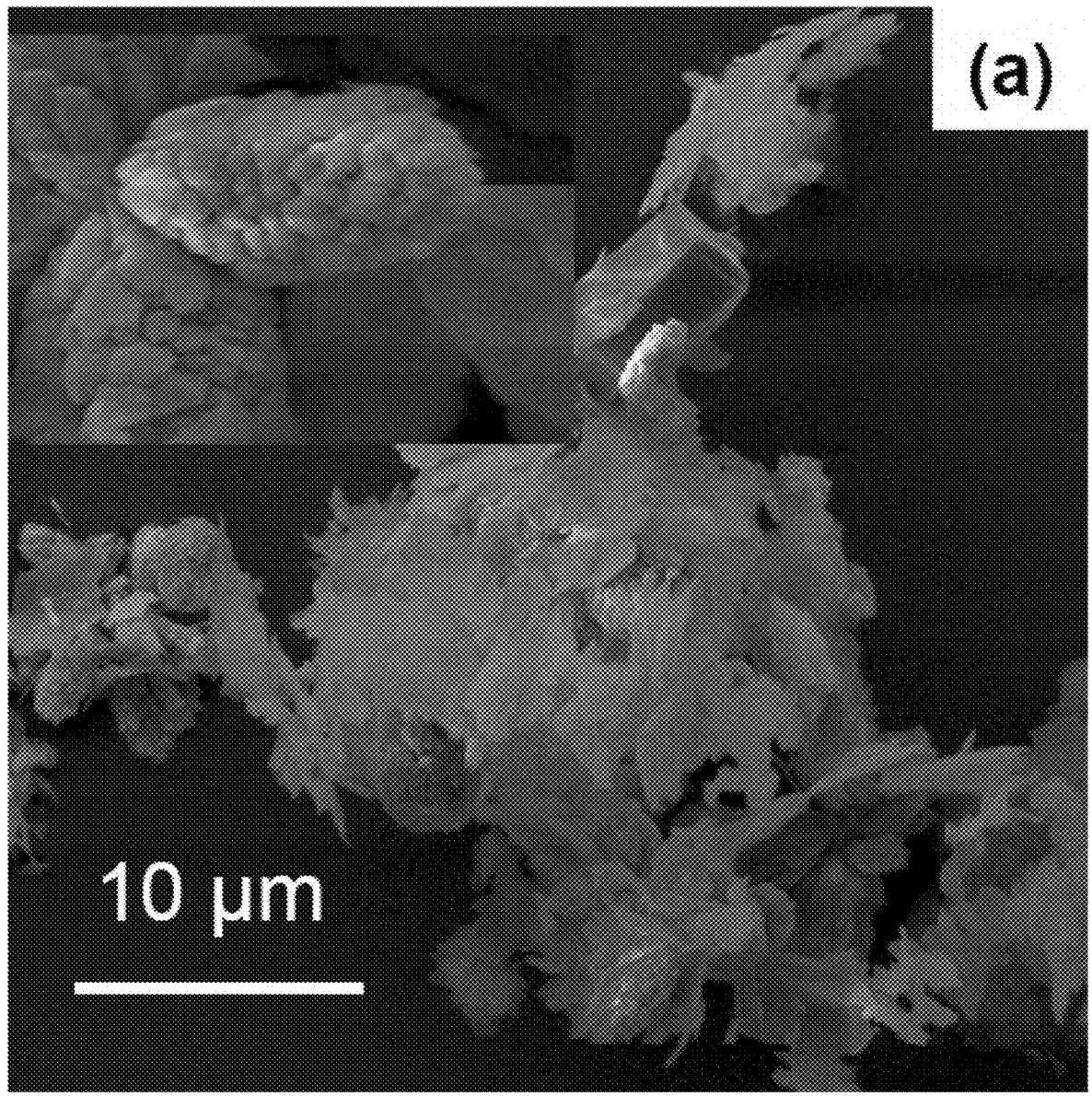
FIG. 3A shows field emission scanning electron microscope (FE-SEM) image of CaY LDH samples with the Ca:Y molar ratio (a) 25:75.
Figure 3B:
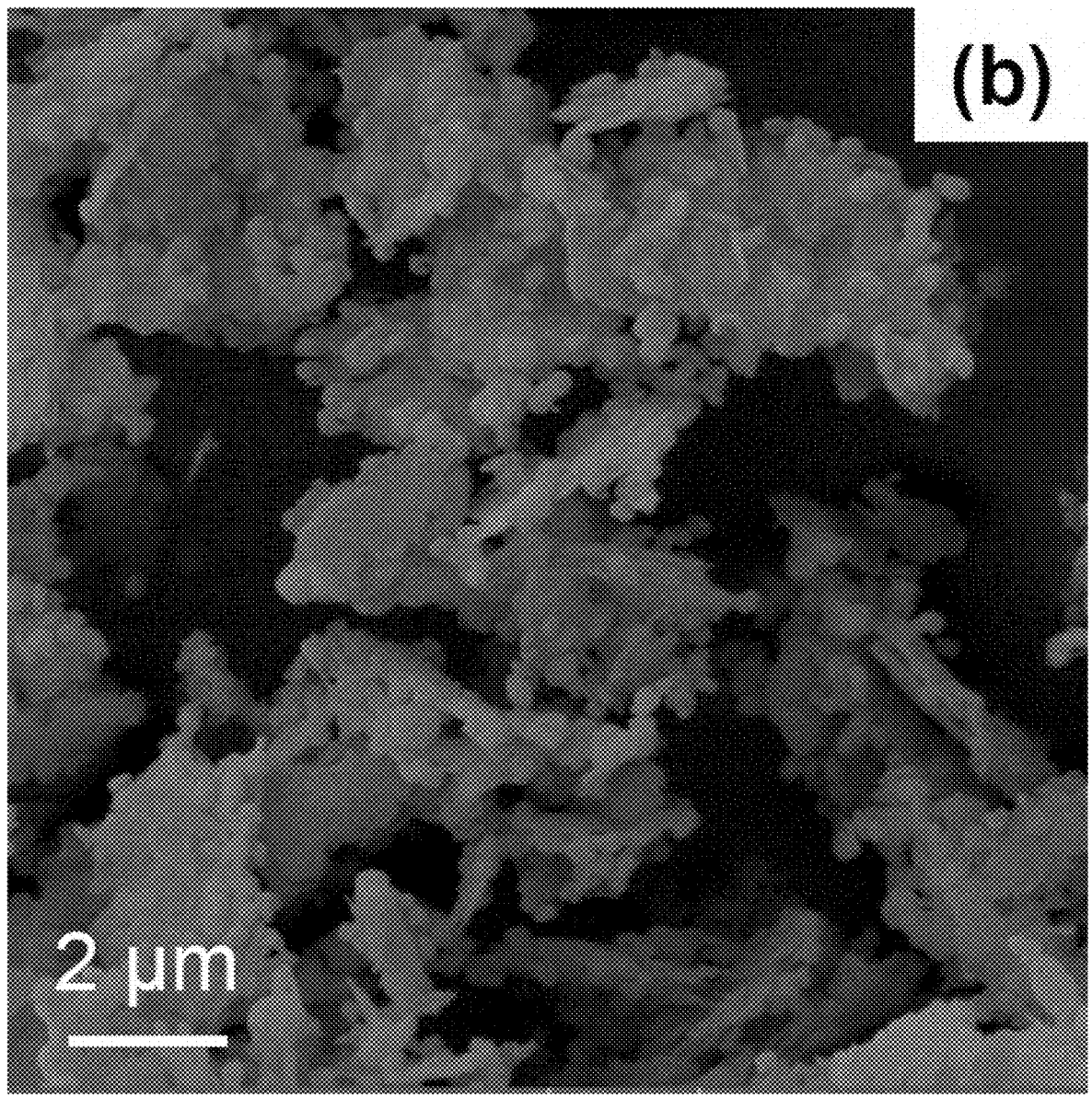
FIG. 3B shows field emission scanning electron microscope (FE-SEM) image of CaY LDH samples with the Ca:Y molar ratio (b) 50:50.
Figure 3C:
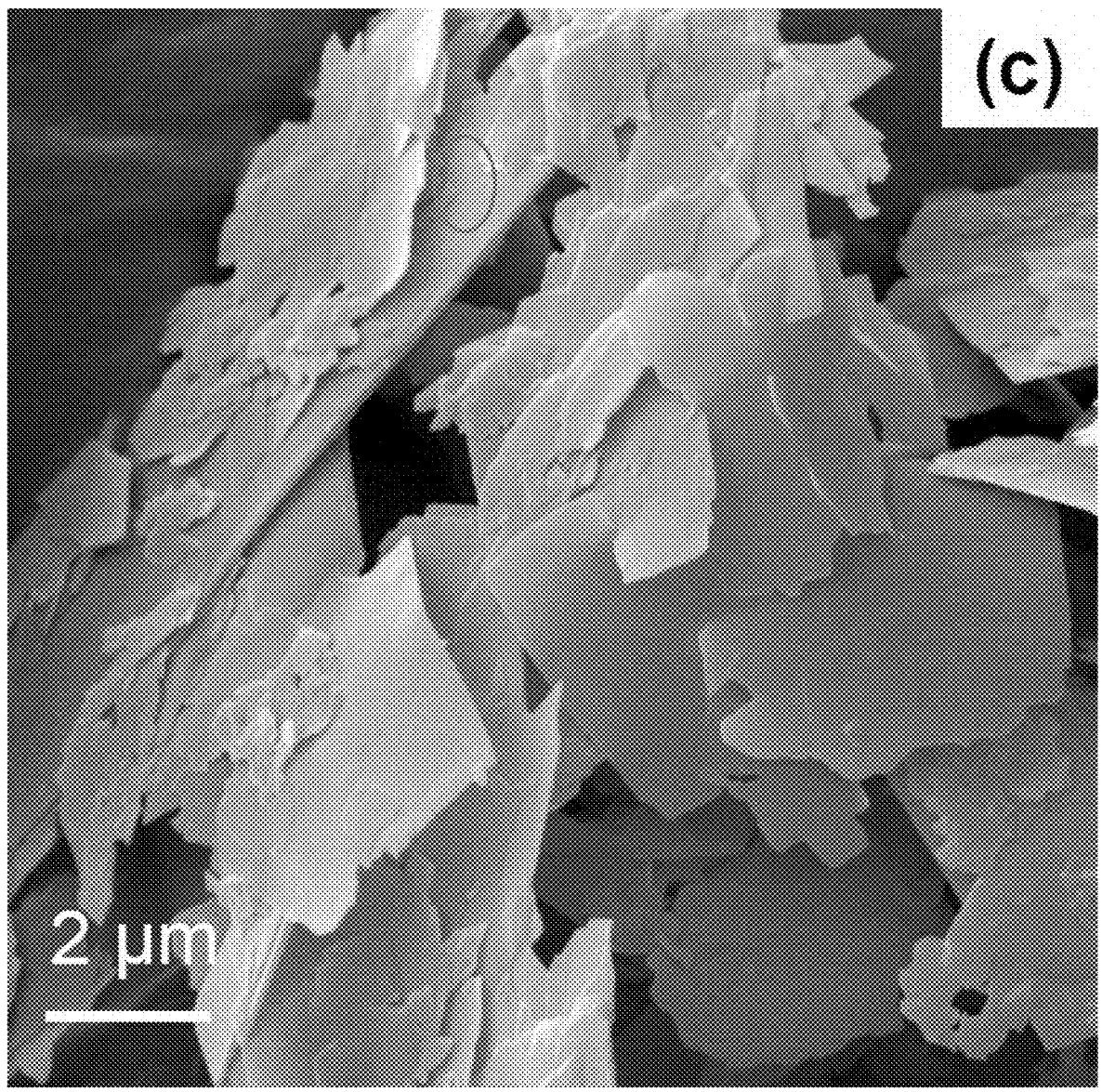
FIG. 3C shows field emission scanning electron microscope (FE-SEM) image of CaY LDH samples with the Ca:Y molar ratio (c) 25:75.

FIG. 3A to C shows field emission scanning electron microscope (FE-SEM) images probing the role in LDH formation of varying Y and Ca contents for constant pH, reaction time, and temperature. As seen in FIG. 3C, sheet-like layer structures start to form when the molar ratio of Y is higher than that of Ca. The insert in FIG. 3A shows that flake- or fiber-type particles with small branches of pineapple-like (or raspberry-like) particles can be formed for a Ca:Y molar ratio of 75:25. As seen in FIG. 3B, when the Ca and Y content is 50:50 mol %, the pineapple-like particles appear to flatten under hydrothermal conditions and spread over the flake particles in the form of grapefruit-like (or citrus grain-like) particles. Finally, FIG. 3C shows CaY—$CO_3^{2-}$ LDH sheet-like crystallites forming for a Ca:Y molar ratio of 25:75. These LDHs comprise larger crystallites with an average lateral dimension above 1, 1.5, 1.75, 2, 2.25, 2.5, 2.75, or 3 μm, as can be seen in the SEM images in FIG. 3C. As seen in FIG. 3C, in a CaY—$CO_3^{2-}$ LDH obtained after a 24 hour hydrothermal treatment as described in the Example, square crystallites formed with lateral dimensions in the range of 0.5 to 10, 1 to 5, or 1.5 to 4.75 μm (e.g., at least 1, 1.25, 1.5, 1.75, 2, 2.25, 2.5, 2.75, or 3 m and/or no more than 20, 15, 10, 7.5, or 5 m. Such large CaY—$CO_3^{2-}$ LDH crystallites, as can be seen in the red ring in FIG. 3C, are not to known to have been reported for LDH materials. Similar morphology with a lateral dimension of 1 to 3 μm arises for MgAl—$CO_3^{2-}$, but only after 10 days of heat treatment. That is, an aspect of the present invention provides LDHs after 16, 20, or 24 hours of hydrothermal treatment, having lateral dimensions in at least 40, 50, 60, or 75% of the LDHs, of more than 3, 4, or 5 μm. The thickness of the sheets in FIG. 3C is approx. <1 nm, e.g., may be less than 2, 1.5, 1.25, 1, 0.75, 0.5, or 0.25 nm on average. Almost all, e.g., at least 50, 60, 70, 75, 80, 85, 90, or 95%, exemplary LDH crystallites as synthesized herein overlap or are interconnected.

Figure 4A:
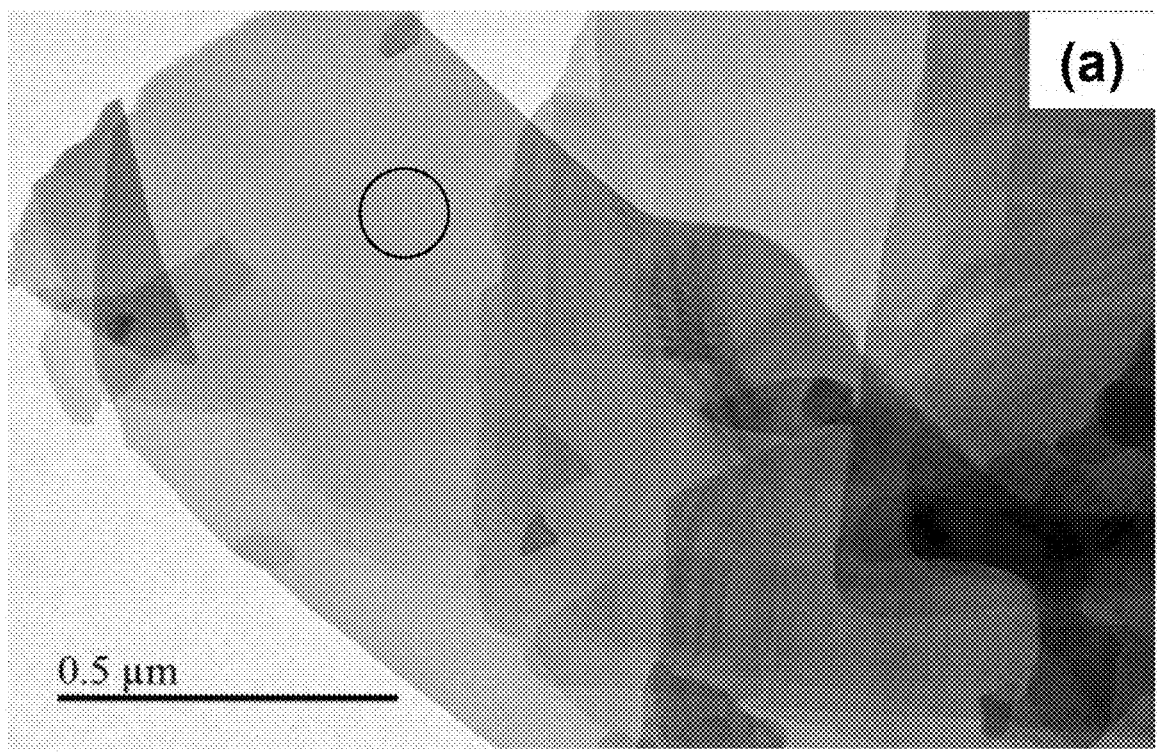
FIG. 4A shows a transmission electron microscope (TEM) image of a CaY LDH sample according to the invention with a Ca:Y molar ratio of 25:75.

FIG. 4A shows a transmission electron microscope (TEM) image supporting the square-type layer structure of the composite materials seen under FE-SEM. FIG. 4A shows a typical TEM image of an inventive CaY LDH nanoplate, which is light in contrast toward its periphery and darker in contrast when overlapping other nanoplates.

Figure 4B:
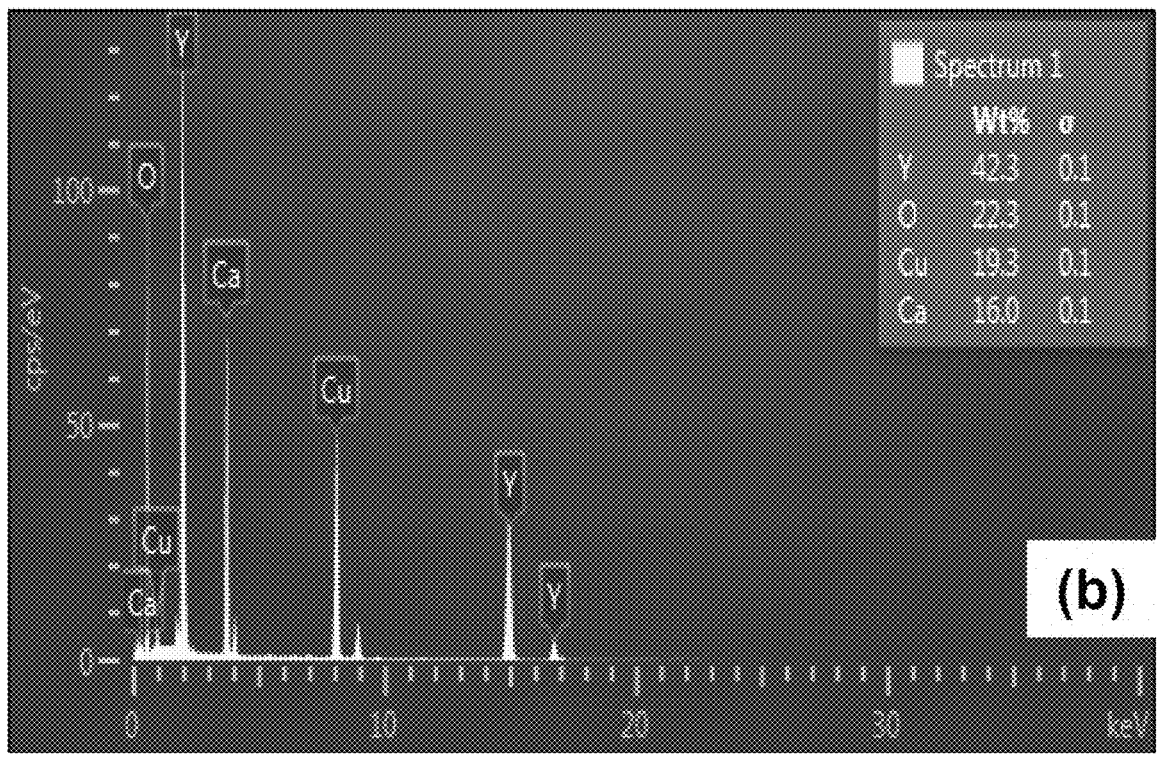
FIG. 4B shows an energy-dispersive x-ray spectroscopy (EDS) spectrum of the region marked by the circle in FIG. 4A.

FIG. 4B shows the energy dispersive X-ray spectroscopy (EDX) results, indicating the presence of Y, Ca, and O. The EDX data were obtained from the position on the surface marked by the circle in FIG. 4A. The elemental map indicates that CaY is present in the nanoplates prepared as described herein, which supporting the position that the product is indeed a CaY LDH. The same elements were also found in other locations, beyond that marked by the circle in FIG. 4A.

Figure 4C:
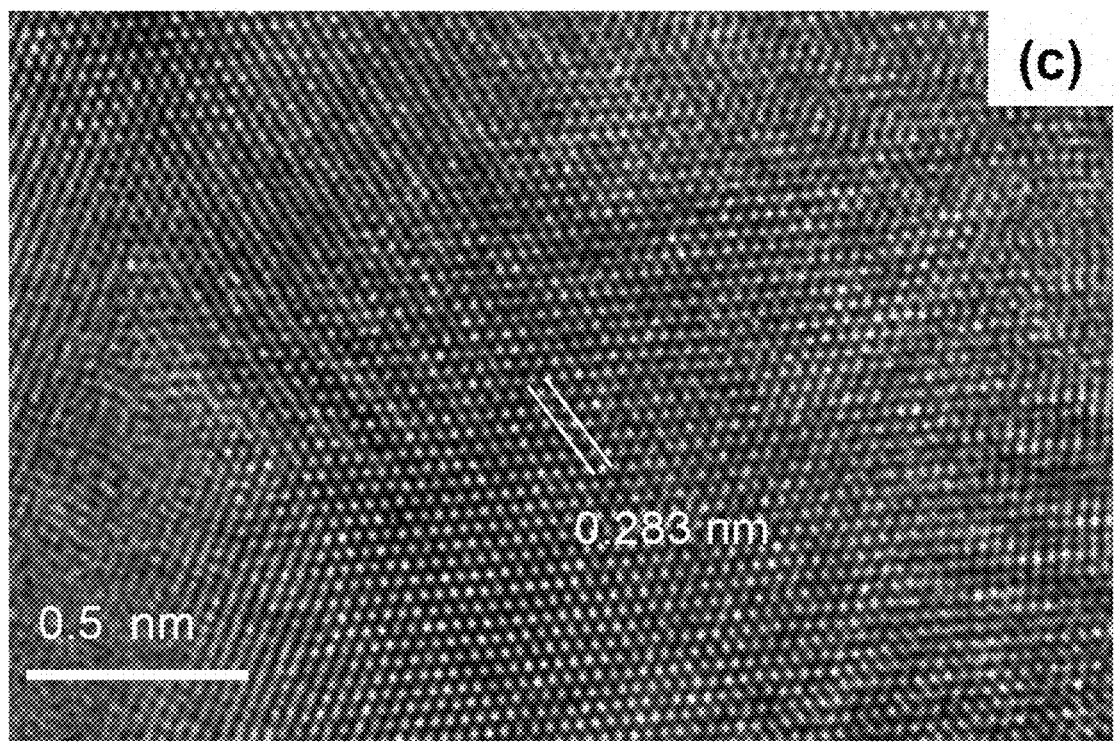
FIG. 4C shows a corresponding high resolution transmission electron microscope (HR-TEM) image of the region marked by the circle in FIG. 4A.

As seen in FIG. 4C, showing a high resolution transmission electron microscope (HR-TEM) image of the region marked by the circle in FIG. 4A, the spacing between the lattice fringes was found to be 0.283±0.004 nm in the sheet structure of an LDH prepared as described herein. FIG. 4C gives the HR-TEM image of a single-crystalline nanosheet.

Figure 4D:
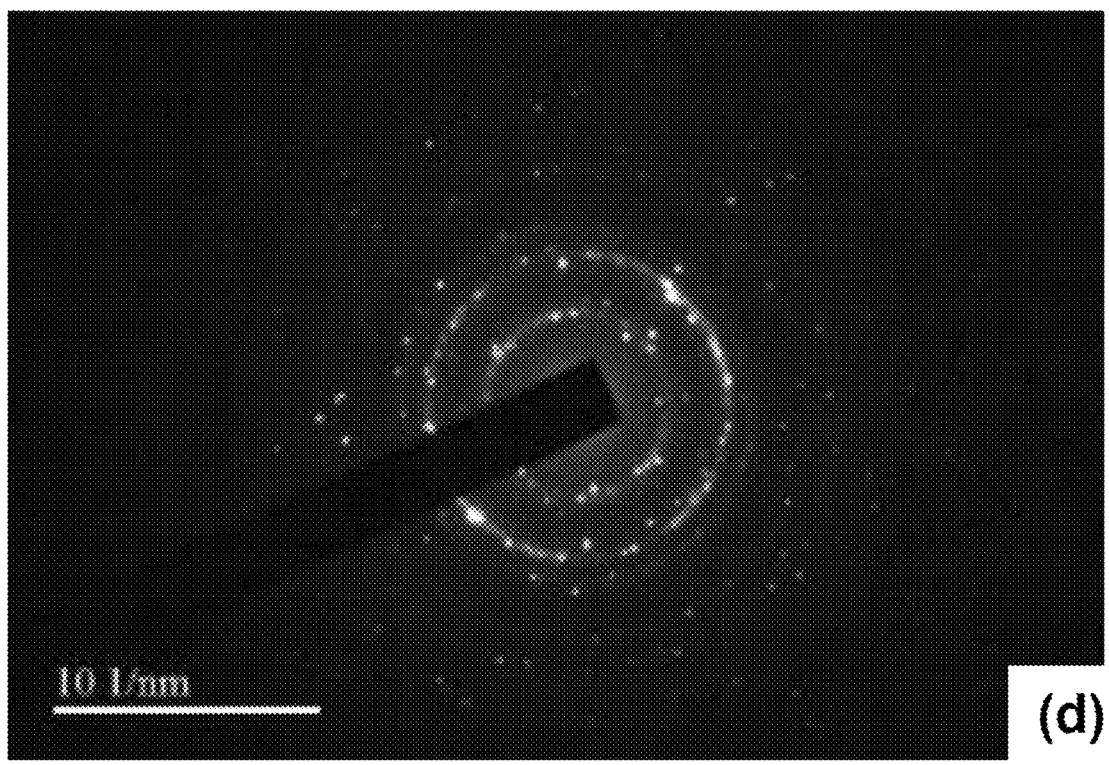
FIG. 4D shows a selected area electron diffraction (SAED) image of a CaY LDH sample according to the invention with a Ca:Y molar ratio of 25:75.

FIG. 4D shows a selected area electron diffraction (SAED) pattern, taken from the sheet in FIG. 4B, with a Ca:Y molar ratio of 25:75 in the LDH. The SAED electron diffraction pattern in FIG. 4D contains broken rings, which suggests that inventive CaY—$CO_3^{2-}$ LDHs can comprise polycrystals with an oriented crystallographic axis.

Figure 5A:
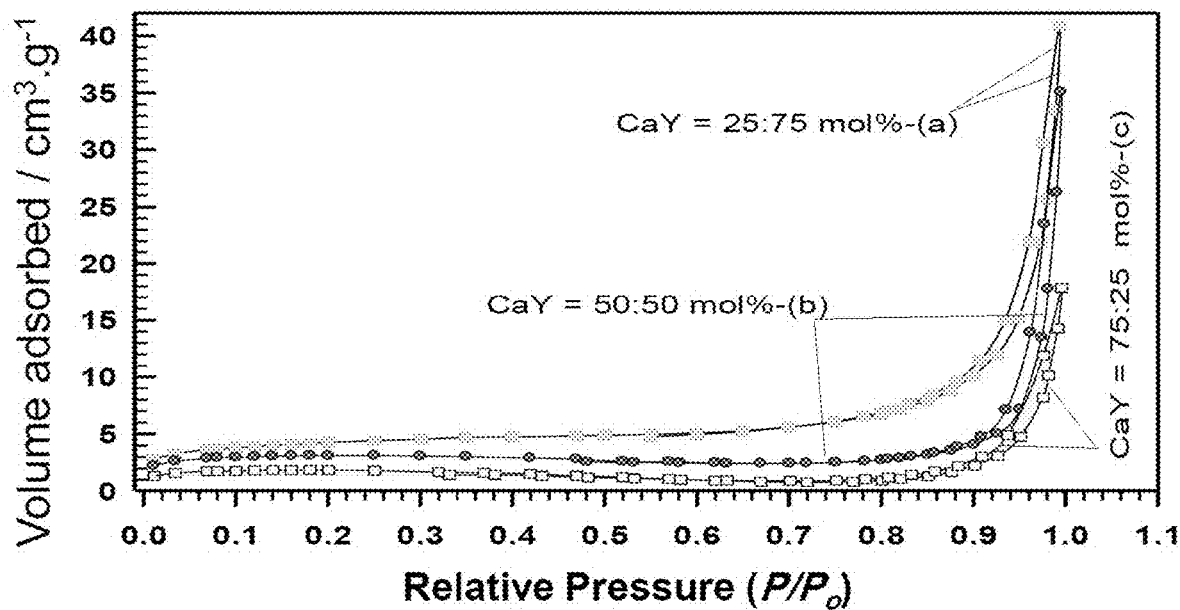
FIG. 5A shows an $N_2$ adsorption/desorption isotherms for CaY LDH samples according to the invention with the Ca:Y molar ratios (a) 25:75, (b) 50:50, and (c) 25:75.

FIG. 5A shows the pore structures of CaY—$CO_3^{2-}$ LDH samples with molar ratios of (a) 25:75, (b) 50:50, and (c) 75:25, which were obtained by determining their $N_2$ adsorption-desorption isotherms. The pores range from large mesopores (i.e., generally between 2 and 50 nm, and, for example, above 10, 15, or 20 nm) to macropores (i.e., above 50 nm), as indicated by a marked leap in the high P/P$_0$ range (0.8 to 1.0) in the isotherms of all samples. The presence of slit-like pores is indicated by the type of isotherm illustrated in FIG. 5A, which are characteristic of adsorption on a layered solid. The isotherms are of type II and have no (or little) adsorption hysteresis, which indicates that the samples are not porous or substantially non-porous, for example no more than 10, 5, 2.5, 1, 0.5, 0.1, 0.01, 0.001, or 0.0001% or less.

Figure 5B:
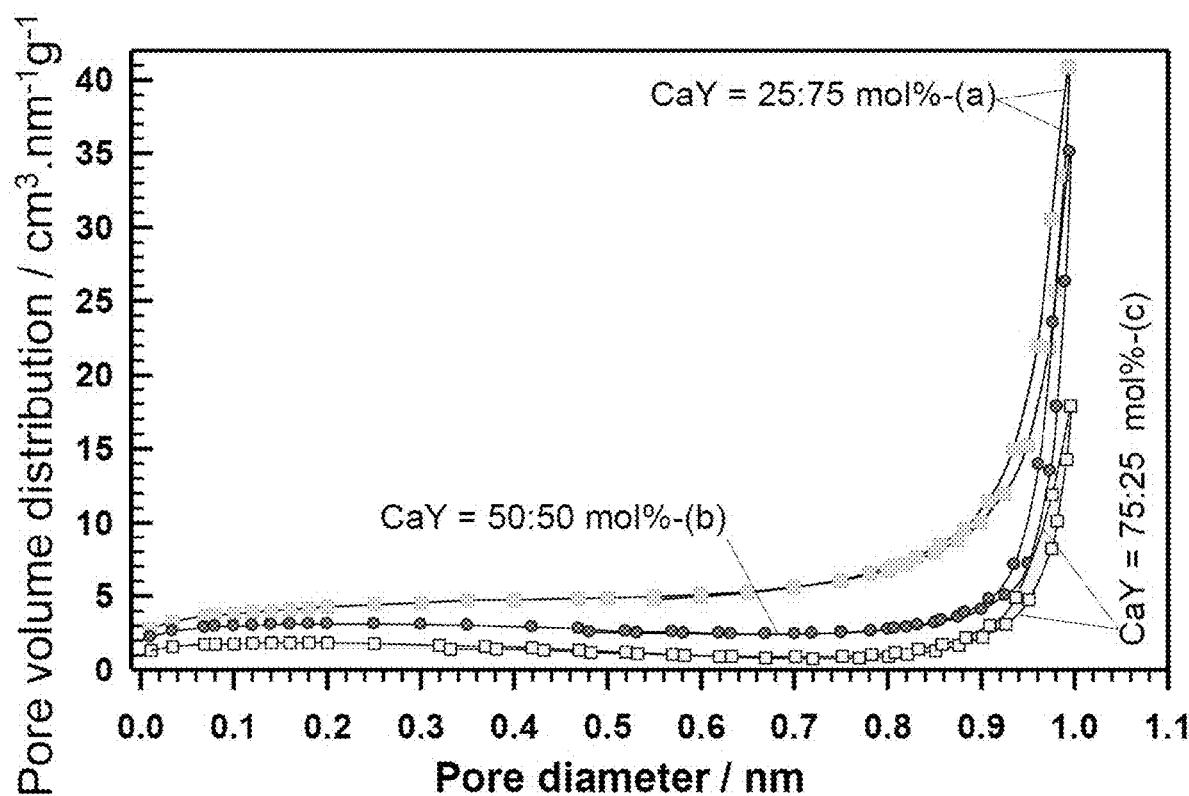
FIG. 5B shows the Barrett, Joyner, and Halenda (BJH) pore size distributions of CaY LDH samples according to the invention with the Ca:Y molar ratios (a) 25:75, (b) 50:50, and (c) 25:75.

FIGS. 5A and B show surface area and pore size measurements for the inventive CaY—$CO_3^{2-}$ LDHs. The surface areas were found to be 13.95 m$^2$/g (25:75 Ca:Y), 9.28 m$^2$/g (50:50 Ca:Y), and 4.96 m$^2$/g (75:25 Ca:Y) for the samples in FIG. 5A (a), (b), and (c), respectively, which indicates that the surface area higher when the Y content is higher. That is, surface areas for inventive CaY—$CO_3^{2-}$ LDHs may be at least 4, 5, 7.5, 8, 9, 10, 11, 12.5, 13, 13.5, 14, or 15 m$^2$/g and/or no more than 50, 40, 35, 30, 25, or 20 m$^2$/g. The sheet-like particles have higher surface areas. In contrast to inventive LDHs, surface areas of only 2 m$^2$/g have been reported for MgAl LDH samples. The pore size distributions of the CaY—$CO_3^{2-}$ LDH samples with molar ratios 25:75 and 50:50 are both broad, in contrast to that of sample 75:25. FIG. 5B shows that samples (a) and (b) contain many more large mesopores and macropores than sample (c).

FIG. 6 shows an equilibrium adsorption isotherm for As$^{5+}$ equilibrium concentrations ranging from 0.02 to 400 ppm. The data points fit well to the Langmuir model, and a $q_m$ value of 501 mg/g was found. The large correlation coefficient, $R^2$ is greater than 0.98, implies that there is a good fit with the Langmuir model, indicating that As$^{5+}$ undergoes monolayer adsorption on a CaY LDH. The rate of adsorption was modelled by using two different rate equations, those of the pseudo-first-order and pseudo-second-order mechanisms. The kinetics of the adsorption of As$^{5+}$ ions by CaY LDH was also investigated in order to study the adsorption rate and pathways of adsorption prior to equilibrium.

FIG. 7 shows the adsorption of As$^{5+}$ was found to be very rapid and highly selective. CaY LDH demonstrates extremely efficient up to 100% removal of $As^{5+}$ within 30 minutes and at $K_d$ values of greater than 104 mL/g (Table 3). These findings are supported by the data in Table 3 and Table 11, above.

Figure 8:
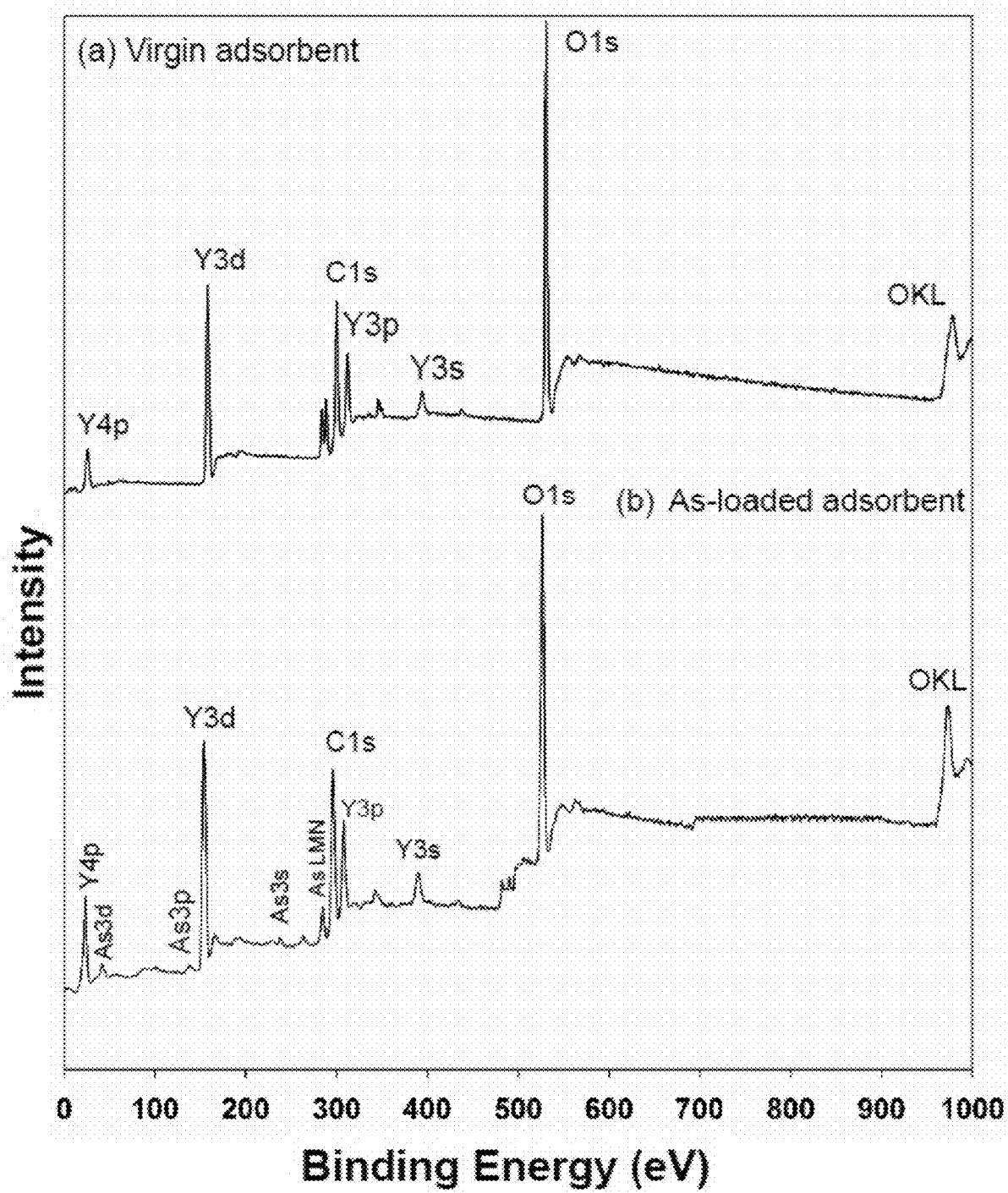
FIG. 8 shows an x-ray photoelectron spectroscopy (XPS) wide scan spectra of (a, above) an as-synthesized adsorbent, and (b, below) an As-loaded adsorbent (post adsorption)

FIGS. 8A and B show wide scan XPS spectra of the as-synthesized and As-loaded adsorbents. FIG. 8 shows XPS spectra of the compositions and chemical states of the CaY LDH adsorbent with a molar ratio 25:75 before and after exposure to arsenic (As) ions. The characteristic peaks of Y, Ca, O, and C in the upper spectrum (a) of FIG. 8 indicate that these elements are present on the surface of the as-synthesized adsorbent, i.e., prior to contact with arsenic. The core level spectrum of Y XPS 3d contains two sublevels (3d3/2 and 3d5/2) due to spin-orbit splitting.

FIG. 8B provides the XPS spectrum of the As-loaded LDH sample, i.e., an inventive (25:75 Ca:Y) LDH after contact with arsenic, which XPS spectrum contains peaks due to elemental yttrium, calcium, oxygen, and carbon, as well as As. The presence of As 3d, As 4p, As 3s, and As LMM peaks indicate that arsenate species have been adsorbed. The As(V) anions appear to have been substituted for the hydroxyl groups and become bound to hydrated yttrium oxide via As—O—Y linkages during the adsorption. These results confirm that As species can be adsorbed onto, incorporated into, or otherwise abstracted by inventive CaY—$CO_3^{2-}$ LDH material. The surface concentration of As was determined to be 2.94 atomic %, as obtained from the XPS spectrum.

Figure 9A:
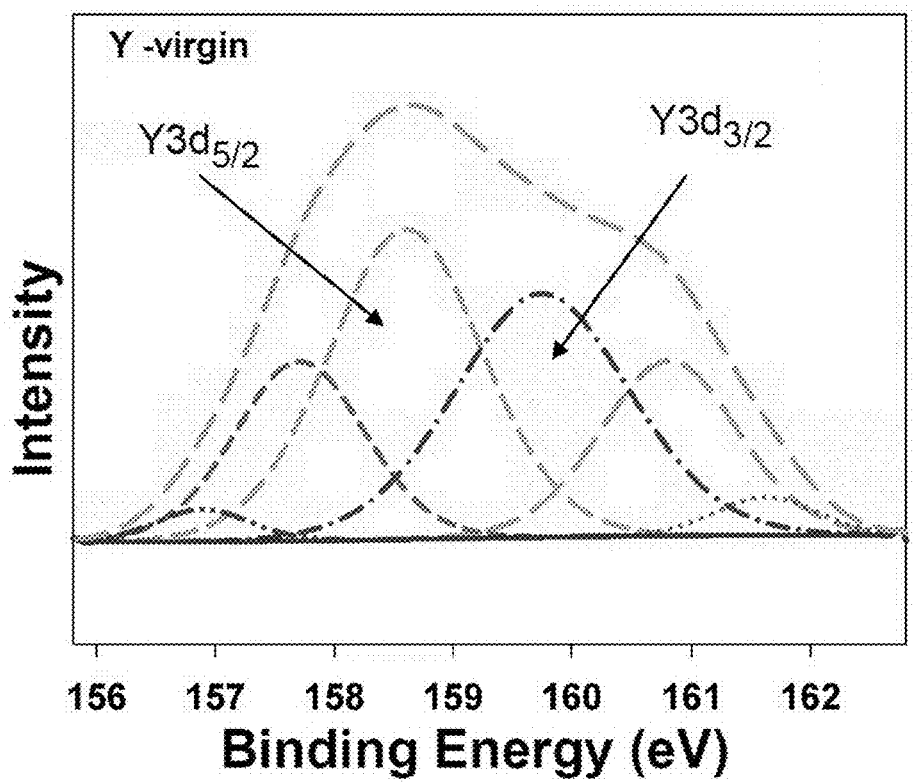
FIG. 9A shows an XPS spectrum of the adsorbent for Y 3d.

FIG. 9A shows that the Y 3d5/2 spectrum can be resolved into four components. The high-resolution Y 3d spectrum contains peaks at 156.9 eV for Y 3d5/2 and another peak at 158.6 eV for Y 3d3/2. These results indicate that yttrium is present in the adsorbent as $Y^{3+}$.

Figure 9B:
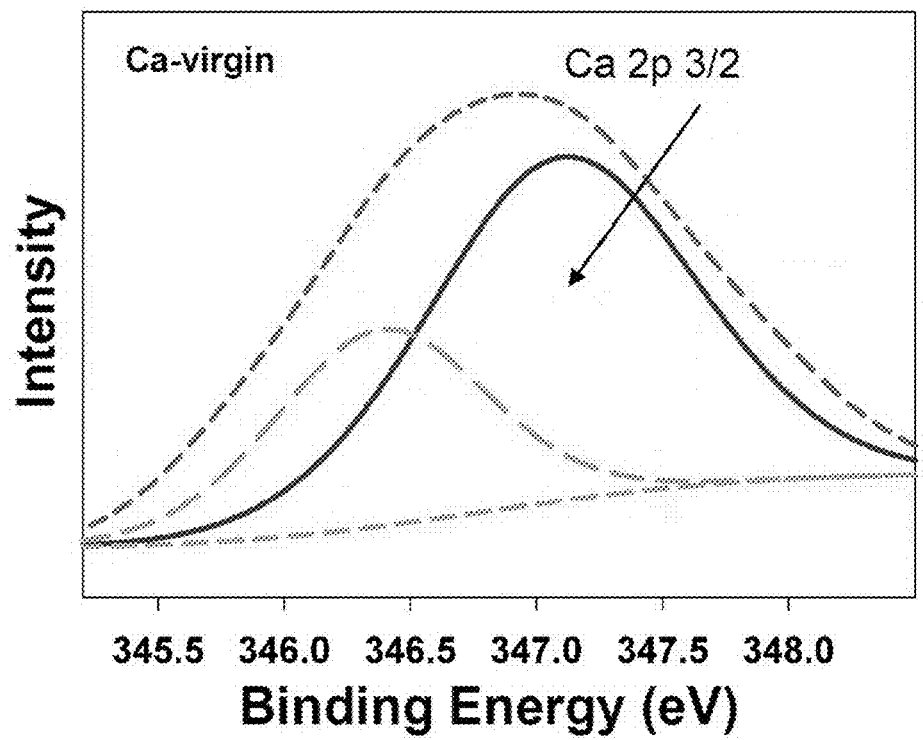
FIG. 9B shows an XPS spectrum of the adsorbent for Ca 2p.

FIG. 9B shows that the Ca XPS 2p core level spectrum consists of two sublevels (2p1/2 and 2p3/2) due to spin-orbit splitting. The Ca 2p3/2 spectrum can be resolved into three components: the first component are due to carbon, and other two components are due to absorbed species and water molecules respectively. The high binding-energy component is probably due to adsorbed oxygen species such as water and carbonates.

Figure 10A:
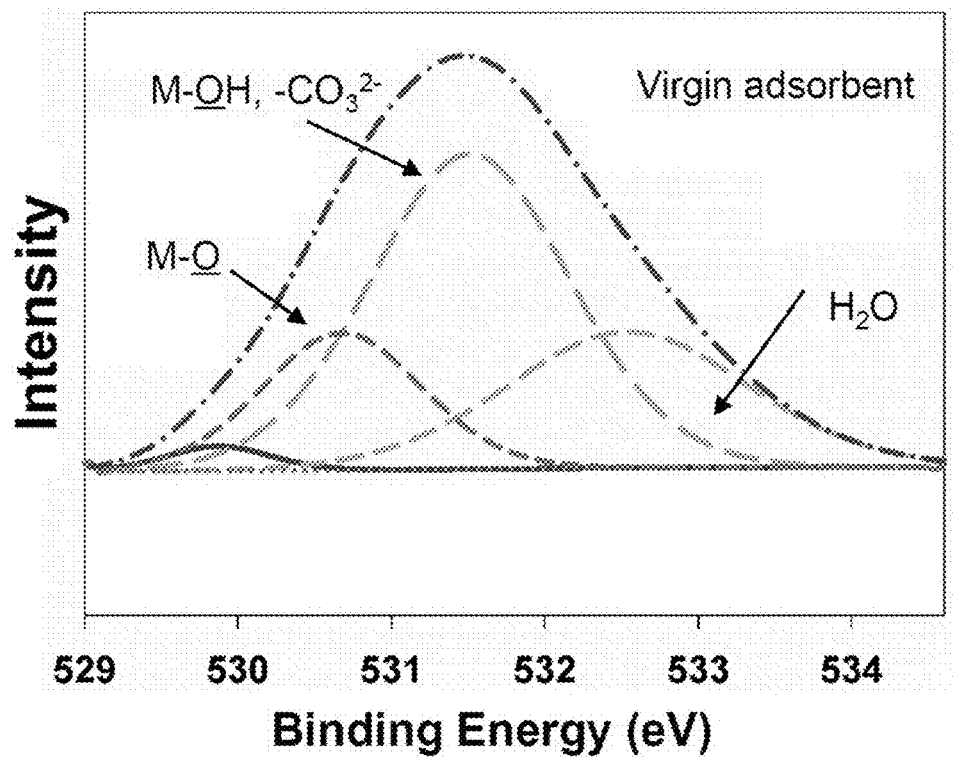
FIG. 10A shows an XPS spectra of an as-synthesized adsorbent for O 1s.
Figure 10B:
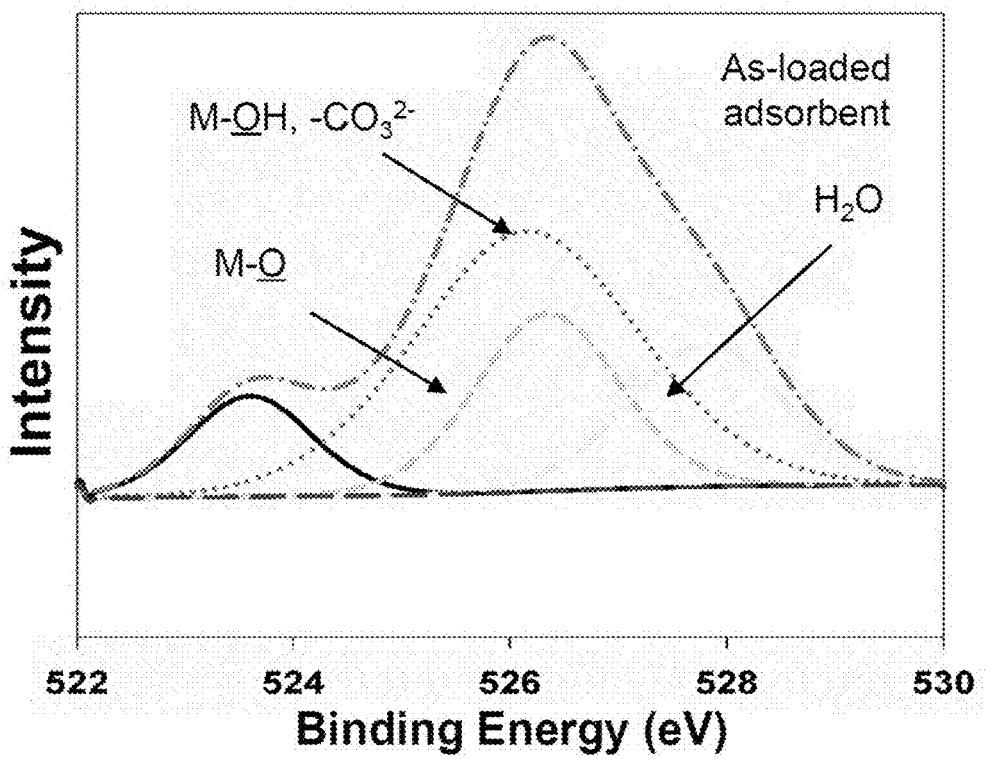
FIG. 10B shows an XPS spectra of an As-loaded (post-adsorption) adsorbent for O 1s.
Figure 10C:
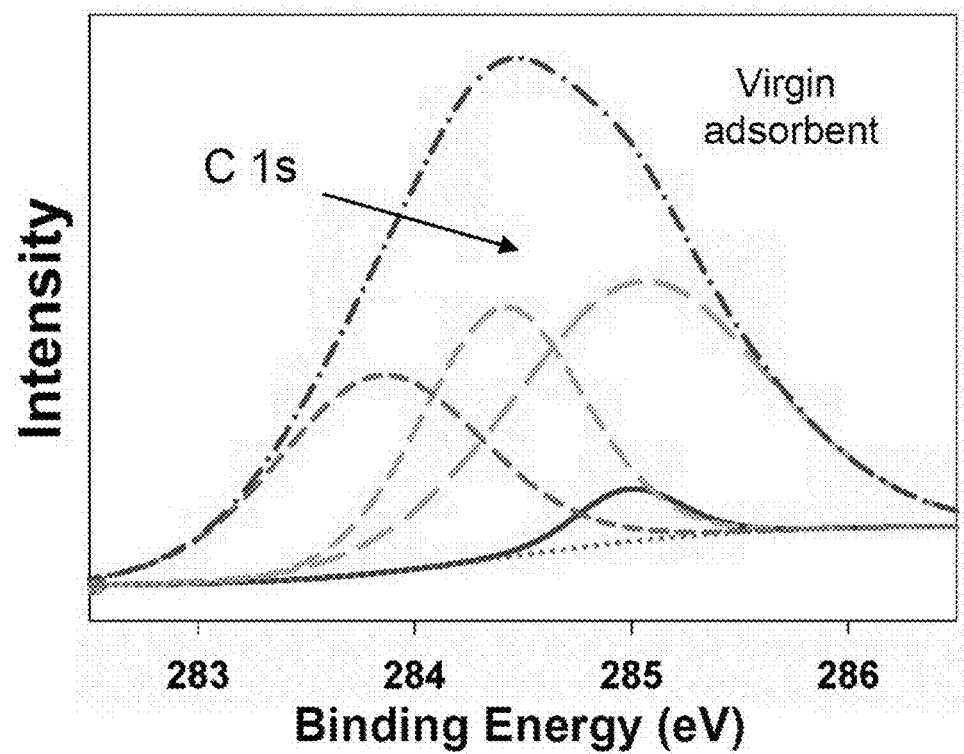
FIG. 10C shows an XPS spectra of an as-synthesized adsorbent for C 1s.
Figure 10D:
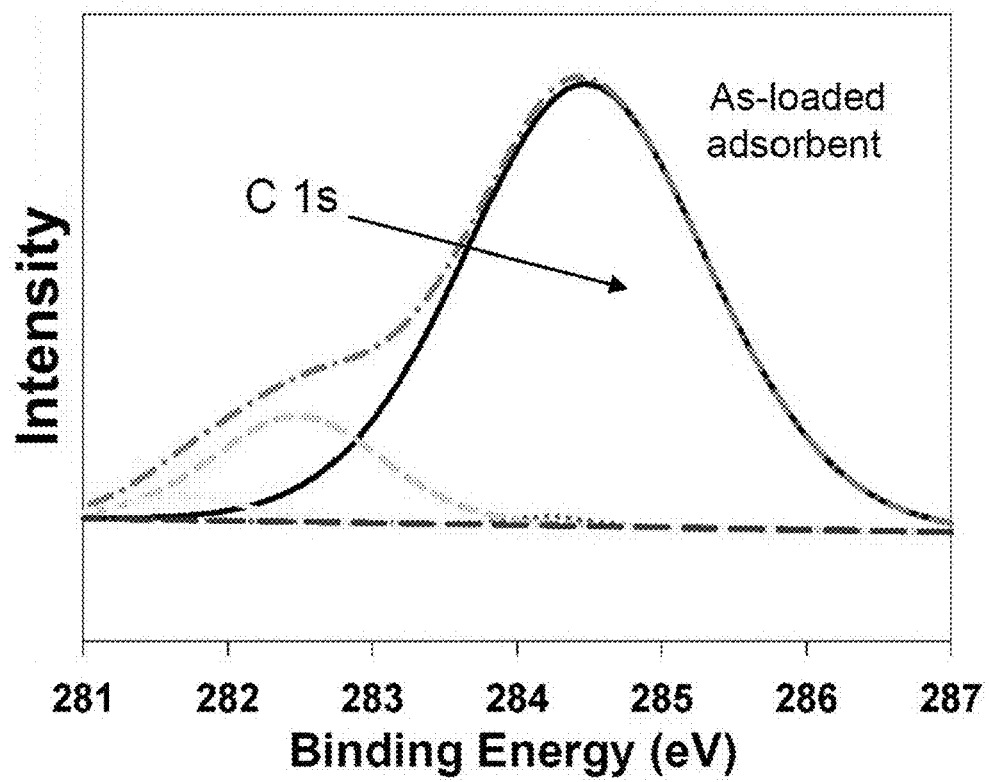
FIG. 10D shows an XPS spectra of an As-loaded (post-adsorption) adsorbent for C 1s.

FIG. 10A shows four component peaks evident in the O 1s spectrum obtained with the high-resolution scan. As seen in FIG. 10A, these peaks may be ascribed to yttrium oxide (YO), hydroxyl groups bonded with yttrium (YOH), and the water bonded to the adsorbent ($H_2O$) with binding energies of 531.4, 531.9, and 533.1 eV, respectively. The other low binding-energy component is probably due to oxygen associated with CaO. The O 1s high binding-energy component is probably due to oxygen species (such as water and carbonates) attached to Y that result from exposure of the sample to air and the hydrothermal process.

The As XPS 3d core level spectrum contains two sublevels, i.e., 3d3/2 and 3d5/2, which might be due to spin-orbit splitting. The As 3d peak is present at 45.5 eV and thus can be assigned to As(V). The other component is probably arsenic oxide ($As_2O_5$). The relative area ratios for the peaks were increased from 17.77% to 19.46% and 12.80% to 22.24%, respectively, because of M-O and $H_2O$ after the metal ions adsorption. On the other hand, the relative area ratio for the peaks were decreased from 69.43% to 58.30% because of M-OH and —$CO_3^{2-}$. This reduction in the peak area ratio, seen in FIG. 10B, indicates that the OH and $CO_3^{2-}$ groups participate in arsenate adsorption on the adsorbent surface. Hence, the hydroxyl groups on the surface of the LDH adsorbent can play an important role in arsenic removal. Sources of carbonate groups in the adsorbent could be the atmosphere and the precipitating agent, ammonium carbonate $(NH_4)_2CO_3$.

Note also that the Y 3d5/2 and Y 3d3/2 peaks shift slightly to higher binding energies when As(V) is adsorbed. This result confirms the attachment of As(V) anions to hydrated yttrium oxide. The compound, Y—O—As, is expected to form during As(V) adsorption by the exchange of hydroxyl groups on the adsorbent surface with As(V) anions in the solution. The area ratio reduction of YaOH after adsorption might be due to the replacement of OH groups.

Figure 11B:
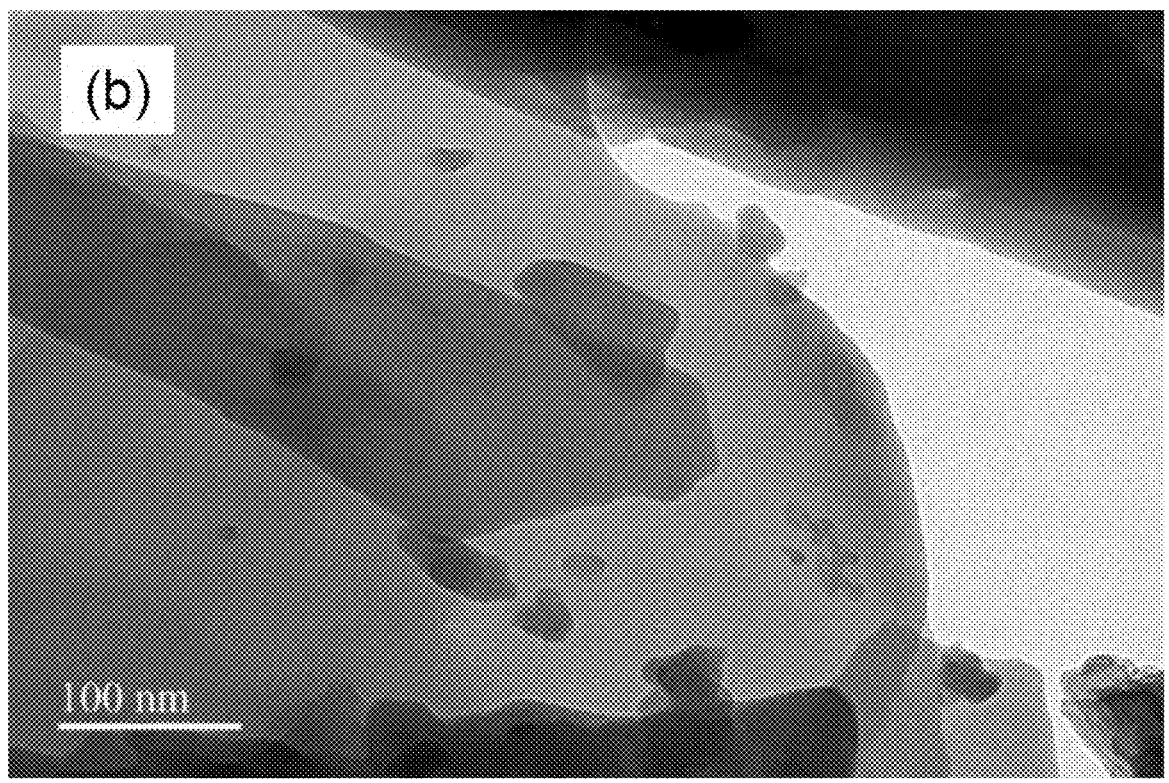
FIG. 11B shows a higher magnification TEM image of a solid CaY LDH sample according to the invention after the adsorption of 10 ppm $As^{5+}$.

FIG. 11B shows a TEM image, indicating that after the As metal ion adsorption, the materials retain their original laminar crystallite shape, which indicates good chemical stability. The typical TEM image in FIG. 11A shows that some round particles are present after the adsorption of metal ions from aqueous media. The appearance of this type of particle after metal ion absorption has been reported in the literature, but the formation of this particle morphology has not been explained. Possibly, such amorphous and/or dust-type particles agglomerate in the presence of $H_2O$ during the metal ion adsorption process.

FIG. 12A to C show SEM images of CaY LDH samples prepared as described herein, with a Ca:Y molar ratio of 25:75, using a hydrothermal method with varied reaction times and/or temperatures: (a) 36 hours at 200° C. (FIG. 12A); (b) 12 hours at 200° C. (FIG. 12B); and (c) 12 hours at 120° C. (FIG. 12C). The evidence in FIG. 12 indicates that hydrothermal reaction time and/or reaction temperature for forming LDHs can be varied to affect the morphology of CaY LDH and ensure the preparation of single-phase materials.

The FE-SEM images show that flake- or fiber-type particles with small branches of pineapple-like particles (see the inset in FIG. 3(a)) are formed for a Ca:Y molar ratio of 75:25 [FIG. 3(a)]. When the Ca and Y content is 50:50 mol %, the pineapple particles are smashed under hydrothermal conditions and spread over the flake particles as grapefruit-like particles [FIG. 3(b)]. Finally Ca—Y—$CO_3^{2-}$ LDH sheet-like crystallites form for a Ca:Y molar ratio of 25:75. These as-prepared LDHs contain or consist of larger crystallites with a lateral dimension above 1 μm on average, as can be seen in the SEM images in FIG. 3(c).

As can be seen in the SEM image of FIG. 12A, thin chef-knife-type particles and/or triangular-prism-type particles were obtained after 36 hours of hydrothermal reaction at 200° C. As seen in FIG. 12B, a layer-type morphology can be obtained after 12 hours at 200° C. FIG. 12C shows that round thin particles can be obtained after 12 hours of hydrothermal reaction at 120° C.

Figure 13:
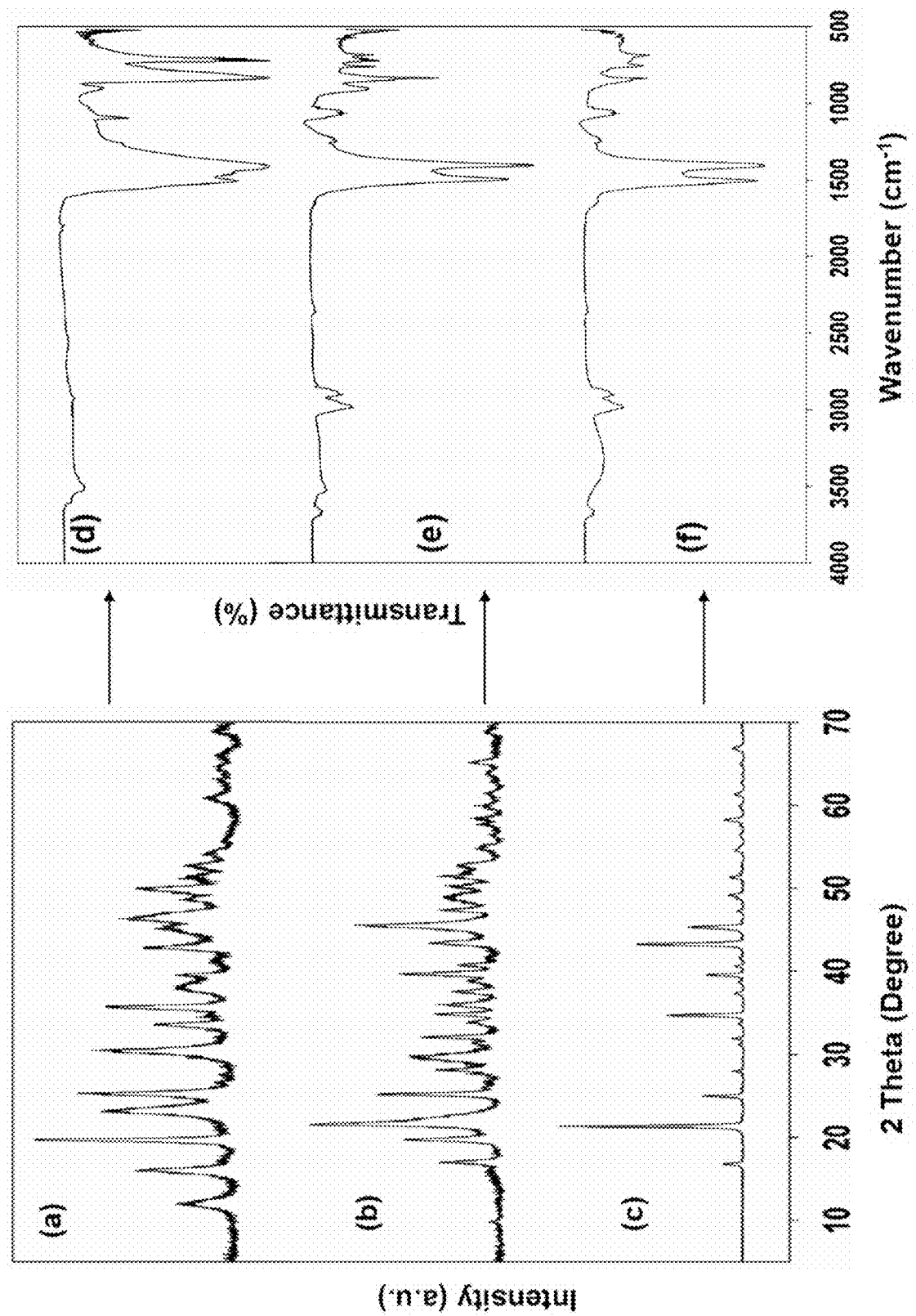
FIG. 13 shows XRD patterns of CaY LDH samples within the scope of the invention, having a Ca:Y molar ratio of 25:75, prepared using a hydrothermal method for two different reaction times and/or temperatures: (a) 36 hours and (b) 12 hours at 200° C. and (c) 12 hours at 120° C., and FTIR spectra (d), (e), and (f) of the corresponding samples.

The effects of varying the hydrothermal reaction time and the temperature were also shown to improve the morphology of CaY LDH and ensure the preparation of single-phase materials. FIG. 12 shows SEM images of as-synthesized CaY LDH samples with a Ca:Y molar ratio of 25:75 prepared by using the hydrothermal method with various reaction times: (a) 36 h and (b) 12 h at 200° C. and (c) 12 h at 120° C. Very thin chef-knife-type particles and/or triangular-prism-type particles were obtained after 36 h hydrothermal reaction at 200° C. [FIG. 12(a)], whereas a layer-type morphology was obtained after 12 h at 200° C. [FIG. 12(b)]; round thin particles were obtained after 12 h hydrothermal reaction at 120° C. FIG. 13 shows the XRD patterns and FTIR spectra of these as-synthesized CaY LDH samples. All the samples contain mixed phases; therefore, none of these samples formed LDH-type materials. Moreover, no typical layered structure with a basal d-value of 0.76 nm was observed.

FIG. 13 shows the x-ray diffraction (XRD) patterns and FT-IR spectra of the CaY LDH samples synthesized at the varied reaction conditions used in FIG. 12, i.e., 36 hours of hydrothermal reaction at 200° C. (a, d), 12 hours of hydrothermal reaction at 200° C. (b, e), and 12 hours of hydrothermal reaction at 120° C. (c, f). All the samples analyzed in FIG. 13 comprise mixed phases. Therefore, none of these samples formed LDH-type materials. Ca—Y—$CO_3^{2-}$ LDH sheet-like crystallites are shown herein to form for a Ca:Y molar ratio of 25:75.

Figure 14:
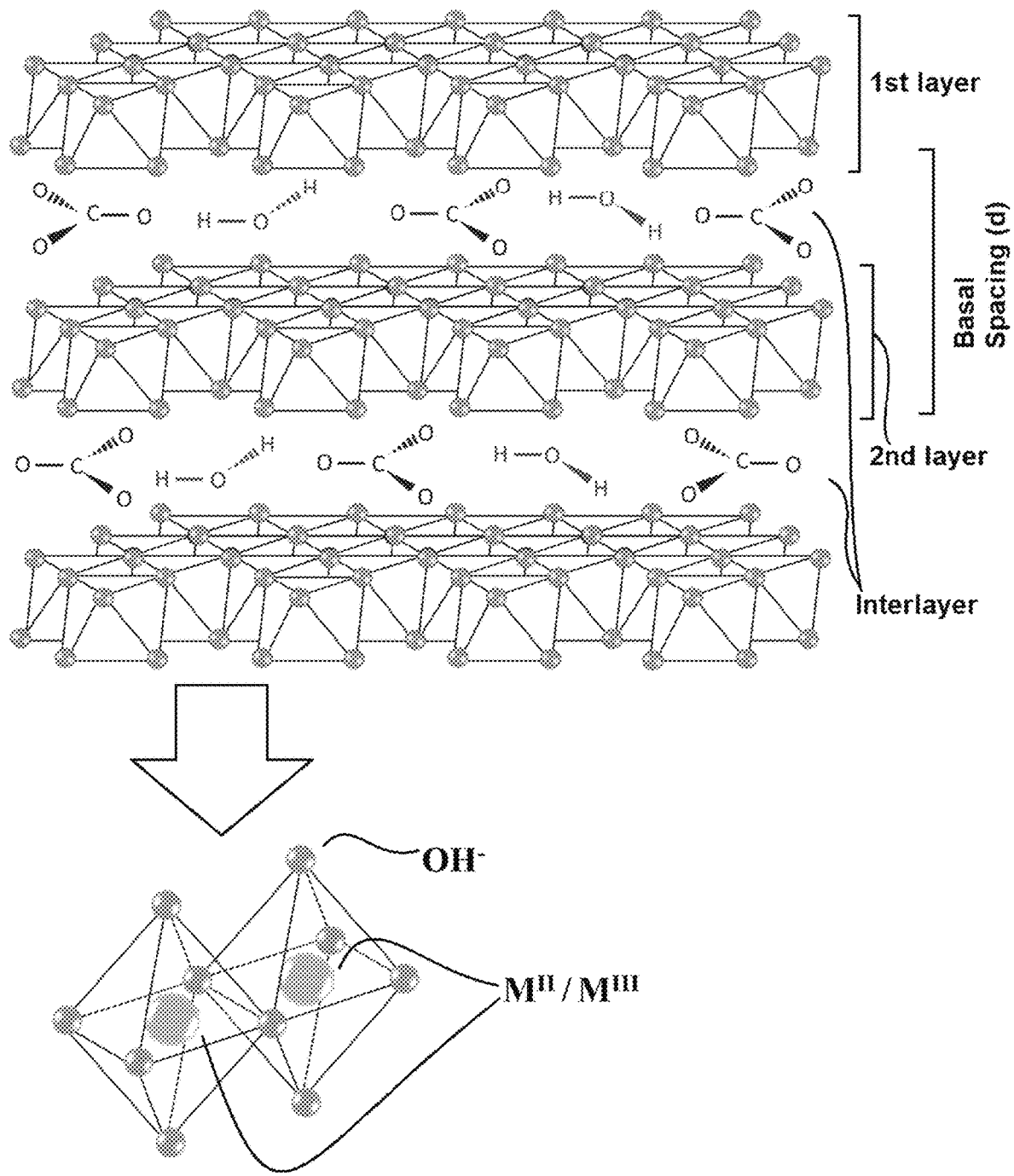
FIG. 14 shows an idealized ball-and-stick representation of a nanostructured hydrotalcite structure, having a hydrated interlayer comprising carbonate ions, with an expanded representation of the metal-ion cells with either bivalent or trivalent cations.
Figure 15:
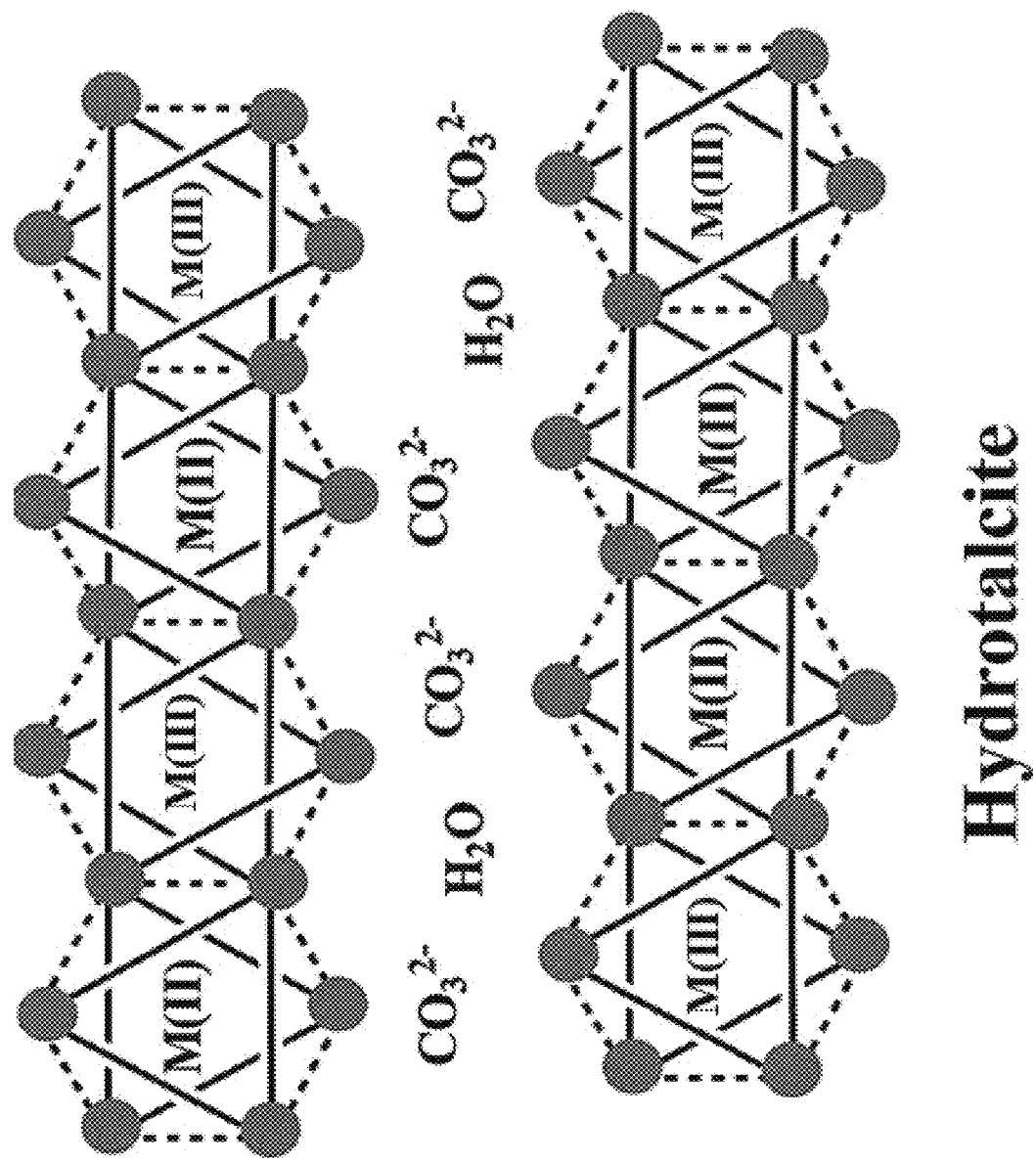
FIG. 15 shows an alternate idealized geometric/ball-and-stick representation of a nanostructured hydrotalcite structure, having a hydrated interlayer comprising carbonate ions.

FIG. 13 shows the XRD patterns and FTIR spectra of these as-synthesized CaY LDH samples. All the samples contain of mixed phases; therefore, none of these samples formed LDH-type materials. Moreover, no typical layered structure with a basal d-value of 0.76 nm was observed. Moreover, no typical layered structure with a basal d-value of 0.76 nm was observed. FIGS. 14 and 15 show theoretical renderings of hydrotalcite (or LDH) structures showing regular arrays of metal-oxide-hydroxide layers and interlayers, the interlayers containing carbonates and being hydrated in these cases. Lattice spacings can be understood, e.g., as the distance between the upper left triangular point (forward projecting) in FIG. 15, and the next/adjacent upper triangle point (backward projecting) to the right of the upper left triangle. The basal spacing (d) is portrayed in FIG. 14. The M(II) and M(III) components represent metals with formal charges and/or valencies of 2 and 3, respectively, which, in the case of inventive hydrotalcite nanostructures, generally substantially comprise Ca(II) and Y(III), e.g., Ca(II) and Y(III) constituting at least a majority or at least 60, 70, 75, 80, 85, 90, or 95 mol. % of the total metals in the nanostructure layers (not including the interlayer).

Numerous modifications and variations of the present invention are possible in light of the above teachings. It is therefore to be understood that within the scope of the appended claims, the invention may be practiced otherwise than as specifically described herein.

The invention claimed is:

1. A nanostructure, comprising:
   Ca(II), Y(III), and carbonate ions interlayered in a hydrotalcite layered structure,
   the hydrotalcite structure comprising:
   a first layer comprising the Ca(II) and Y(III) in a regularly arranged array:
   an interlayer comprising the carbonate ions; and
   a second layer comprising the Ca(II) and Y(III) in a regularly arranged array, sandwiching the interlayer with the first layer;
   wherein
   a molar ratio of the Ca(II) to Y(III) in the nanostructure is from 1:1 to 1:8, and
   a surface area of the nanostructure is from 9.28 m²/g to 50 m²/g.

2. The nanostructure of claim 1, wherein the nanostructure is in the form of sheet-like layer structures having square crystallites with lateral dimensions of from 0.5 μm to 20 μm.

3. The nanostructure of claim 1, wherein a molar ratio of the Ca(II) to Y(III) is in a range of from 1:3 to 1:8.

4. The nanostructure of claim 1, having a basal d value in a range of from 0.60 to 1.25 nm.

5. The nanostructure of claim 1, having a longest average dimension in plane with the layer in a range of from 0.75 to 10 μm.

6. The nanostructure of claim 1, wherein the interlayer comprises at least 75 mol. % carbonate ions, relative to a total amount of ions in the interlayer.

7. The nanostructure of claim 1, wherein the amount of the Ca(II) and the Y(III) is at least 80 mol. % of all metal elements in the layers.

8. The nanostructure of claim 1, comprising a further interlayer comprising the carbonate ions; and
   a further layer comprising the Ca(II) and Y(III) in a regularly arranged array, sandwiching the further interlayer with the first or the second layer.

9. The nanostructure of claim 1, wherein at least 50% of the layers, based on a total area of the layers, have a lattice structure including lattice spacings between lattice fringes, and
   wherein the spacings have an average distance from each other in a range of from 0.225 to 0.350 nm.

10. A method of preparing the nanostructure of claim 1, comprising:
    preparing an aqueous solution comprising Y(III), Ca(II), and carbonate ions, the solution having pH of above 7; and
    heating the solution in a sealed vessel to a temperature in a range of from 150 to 250° C. for a period of no more than 7 days to obtain the layered nanostructure in hydrotalcite form.

11. The method of claim 10, wherein the Y(III) is provided as an acetate, trifluoroacetate, formate, borate, tetrafluoroborate, oxalate, citrate, tartrate, chloride, perchlorate, chlorate, bromide, perbromate, bromate, iodide, periodate, iodate, nitrate, sulfate, or mixture of two or more of these.

12. The method of claim 10, wherein the Ca(II) is provided as a bicarbonate, azide, acetate, azide, trifluoroacetate, formate, borate, tetrafluoroborate, citrate, tartrate, chloride, perchlorate, chlorate, bromide, perbromate, bromate, iodide, periodate, nitrate, nitrite, permanganate, or mixture of two or more of these.

13. The method of claim 10, wherein the heating is in a range of from 180 to 220° C. for no more than 2 days.

14. A method for reducing a metal ion content of a fluid, comprising:
    contacting the fluid with the nanostructure of claim 1;
    adsorbing the metal ion to the nanostructure; and
    separating the nanostructure with the adsorbed metal ion from the fluid to obtain the fluid comprising a reduced content of the metal ion.

15. The method of claim 14, wherein the fluid comprises water.

16. The method of claim 15, wherein the metal ion is $Cr^{+3}$, $Cd^{+2}$, $Ni^{+2}$, $Cu^{+2}$, $Zn^{+2}$$Hg^{+2}$, $Pb^{+2}$, $As^{+5}$, or a mixture of two or more of these.

17. The method of claim 15, wherein the contacting occurs for at least 5 minutes and/or no more than 24 hours, a pH of the fluid is from 1.0 to 9.0.

* * * * *